US009916186B2

United States Patent
Gainey, Jr. et al.

(10) Patent No.: US 9,916,186 B2
(45) Date of Patent: *Mar. 13, 2018

(54) MANAGING PROCESSING ASSOCIATED WITH SELECTED ARCHITECTURAL FACILITIES

(71) Applicant: INTERNATIONAL BUSINESS MACHINES CORPORATION, Armonk, NY (US)

(72) Inventors: Charles W. Gainey, Jr., Poughkeepsie, NY (US); Michael K. Gschwind, Chappaqua, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 107 days.

This patent is subject to a terminal disclaimer.

(21) Appl. No.: 14/554,675

(22) Filed: Nov. 26, 2014

(65) Prior Publication Data
US 2015/0269004 A1 Sep. 24, 2015

Related U.S. Application Data

(63) Continuation of application No. 14/217,824, filed on Mar. 18, 2014.

(51) Int. Cl.
G06F 9/455 (2006.01)
G06F 9/50 (2006.01)
(Continued)

(52) U.S. Cl.
CPC .............. G06F 9/5077 (2013.01); G06F 9/30 (2013.01); G06F 9/45533 (2013.01);
(Continued)

(58) Field of Classification Search
CPC ................. G06F 9/30; G06F 2212/657; G06F 2009/45583; G06F 9/45558; G06F 9/5077;
(Continued)

(56) References Cited

U.S. PATENT DOCUMENTS 5,551,013 A 8/1996 Beausoleil et al.
5,574,873 A 11/1996 Davidian
(Continued)

FOREIGN PATENT DOCUMENTS

EP 001980944 A2 10/2008
EP 002290539 A1 3/2011
(Continued)

OTHER PUBLICATIONS

"System /370 Extended Architecture/Interpretive Execution," IBM Publication No. SA22-7095-01, Sep. 1985, pp. 1-32.
(Continued)

Primary Examiner — Li B Zhen
Assistant Examiner — Sen Chen
(74) Attorney, Agent, or Firm — Steven Chiu; Matthew M. Hulihan; Heslin Rothenberg Farley & Mesiti PC

(57) ABSTRACT

A facility is provided that, when installed, removes from an architecture a selected architectural function, such that the function is not able to be turned on/off regardless of other controls within the environment. When the facility is installed, the architectural function is not supported when processing in an architectural mode based on the architecture. It is as if the selected architectural function is no longer available in the architecture, and in fact, the code implementing the facility may have been deleted, bypassed, or otherwise eliminated. One such architectural function is virtual address translation, such as dynamic address translation (DAT), and the architecture is, for instance, ESA/390.

7 Claims, 23 Drawing Sheets

(51) Int. Cl.
  *G06F 11/30* (2006.01)
  *G06F 11/34* (2006.01)
  *G06F 12/1009* (2016.01)
  *G06F 9/30* (2018.01)
(52) U.S. Cl.
  CPC ........ *G06F 9/45558* (2013.01); *G06F 11/301* (2013.01); *G06F 11/3409* (2013.01); *G06F 12/1009* (2013.01); *G06F 2009/45583* (2013.01); *G06F 2212/657* (2013.01)
(58) Field of Classification Search
  CPC .............. G06F 9/45533; G06F 11/301; G06F 11/3409; G06F 12/1009
  USPC .......................................................... 718/1
  See application file for complete search history.

(56) References Cited

U.S. PATENT DOCUMENTS

| | | | |
|---|---|---|---|
| 5,790,825 | A | 8/1998 | Traut |
| 6,009,261 | A | 12/1999 | Scalzi et al. |
| 6,199,202 | B1 | 3/2001 | Coutant et al. |
| 6,308,255 | B1 | 10/2001 | Gorishek, IV et al. |
| 6,463,582 | B1 | 10/2002 | Lethin et al. |
| 6,496,971 | B1 | 12/2002 | Lesea et al. |
| 7,159,102 | B2 | 1/2007 | Irie et al. |
| 7,406,682 | B2 | 7/2008 | Todd et al. |
| 7,496,498 | B2 | 2/2009 | Solomon et al. |
| 7,562,349 | B2 | 7/2009 | Fleischer et al. |
| 7,596,705 | B2 | 9/2009 | Kim |
| 7,647,589 | B1 | 1/2010 | Dobrovolskiy et al. |
| 7,821,849 | B2 | 10/2010 | Oberlaender et al. |
| 8,117,417 | B2 | 2/2012 | Greiner et al. |
| 8,301,865 | B2 | 10/2012 | Grohoski et al. |
| 8,364,912 | B2 | 1/2013 | Farrell et al. |
| 8,479,172 | B2 | 7/2013 | Duale et al. |
| 2005/0114555 | A1 | 5/2005 | Errickson et al. |
| 2005/0223225 | A1 | 10/2005 | Campbell et al. |
| 2005/0240753 | A1 | 10/2005 | Zimmer et al. |
| 2006/0075218 | A1* | 4/2006 | Barragy ............... G06F 9/30181 713/100 |
| 2009/0210874 | A1* | 8/2009 | Harris .................... G06F 9/4552 718/1 |
| 2011/0035725 | A9 | 2/2011 | Naik et al. |
| 2011/0320825 | A1 | 12/2011 | Greiner et al. |
| 2012/0260064 | A1* | 10/2012 | Henry ................. G06F 9/30076 712/41 |
| 2012/0297180 | A1* | 11/2012 | Teng ........................ G06F 9/441 713/2 |
| 2013/0024659 | A1 | 1/2013 | Farrell et al. |
| 2013/0138907 | A1 | 5/2013 | Farrell et al. |
| 2013/0305023 | A1 | 11/2013 | Gainey et al. |
| 2013/0339975 | A1 | 12/2013 | Busaba et al. |
| 2015/0268965 | A1 | 9/2015 | Gschwind |
| 2015/0268966 | A1 | 9/2015 | Gschwind |
| 2015/0268972 | A1 | 9/2015 | Gainey, Jr. et al. |
| 2015/0269085 | A1 | 9/2015 | Gainey, Jr. et al. |
| 2015/0269117 | A1 | 9/2015 | Gainey, Jr. et al. |
| 2015/0303975 | A1* | 10/2015 | Calhoun .............. H04B 1/1607 455/73 |

FOREIGN PATENT DOCUMENTS

| | | |
|---|---|---|
| WO | WO2008083277 A1 | 7/2008 |
| WO | WO2011114121 A1 | 9/2011 |
| WO | WO201398643 A2 | 7/2013 |

OTHER PUBLICATIONS

"z/Architecture—Principles of Operation," Publication No. SA22-7832-09, 10$^{th}$ Edition, Sep. 2012, pp. 1-1568.
"z/VM The Very Basics," downloaded from interne Mar. 11, 2014, wwwlgis.informatik.uni-kl.de, pp. 1-26.
Anonymous, "Traffic Translator to Maximize Bandwidth of Legacy IP's on AXI," IPCOM000215484D, Mar. 2012, 9 pages.
Gainey, Charles W. Jr., et al., U.S. Appl. No. 14/217,840, entitled "Architectural Mode Configuration," filed Mar. 18, 2014, 114 pages.
Gregg, Thomas A., et al., "Overview of IBM zEnterprise 196 Subsystem with Focus on New PCI Express Infrastructure," IBM Journal of Research and Development, vol. 56, No. 1/2, Jan./Mar. 2012, pp. 8:1-8:14.
Gschwind, Michael K., U.S. Appl. No. 14/217,800, entitled "Common Boot Sequence for Control Utility Able to be Initialized on Multiple Architectures,", filed Mar. 18, 2014, 119 pages.
Johansen, Klaus, "Availability and Performance Aspects for Mainframe Consolidated Servers," PhD diss., Master's Thesis, Technical University of Denmark, DTU, Sep. 2007, 144 pages.
Mawatari, M. et al. "464XLAT: Combination of Stateful and Stateless Translation," IPCOM000226417, Apr. 2013, 29 pages.
Mell, Peter and Tim Grance, "The NIST Definition of Cloud Computing," National Institute of Standards and Technology, Information Technology Laboratory, Version 15, Oct. 7, 2009, pp. 1-2.
Osisek, et al., "ESA/390 interpretive-execution architecture, foundation for VM/ESA," IBM Systems Journal, vol. 30, No. 1, Jan. 1991, pp. 34-51.
Plambeck et al., "Development and Attributes of z/Architecture," IBM Journal of Research and Development, vol. 46, No. 4/5, Jul./Sep. 2002, pp. 367-379.
z/VM: Running Guest Operating Systems, IBM® Publication No. SC24-5997-02, Oct. 2001, pp. 1-179.
International Search Report for PCT/EP2015/053638 dated May 4, 2015, pp. 1-11.
International Search Report for PCT/EP2015/054841 dated Jun. 3, 2015, pp. 1-10.
International Search Report for PCT/EP2015/054850 dated May 28, 2015, pp. 1-18.
IBM Redbooks et al., "IBM eServer zSeries 900 Technical Guide," Sep. 2002, pp. 233, 234 & 236.
Office Action in U.S. Appl. No. 14/217,824, dated Nov. 19, 2015, pp. 1-29.
Office Action in U.S. Appl. No. 14/217,800, dated Feb. 26, 2016, pp. 1-17.
Office Action in U.S. Appl. No. 14/217,840, dated Feb. 26, 2016, pp. 1-17.
Office Action filed in U.S. Appl. No. 14/217,824 dated Jun. 23, 2016, 26 pgs.
Office Action filed in U.S. Appl. No. 14/554,313 dated Jun. 23, 2016, 16 pgs.
Notice of Allowance filed in U.S. Appl. No. 14/217,840 dated Sep. 9, 2016, 7 pgs.
Office Action filed in U.S. Appl. No. 14/554,806 dated Jul. 14, 2016, 19 pgs.
Office Action filed in U.S. Appl. No. 14/217,824 dated Dec. 27, 2016, 26 pgs.
Final Office Action issued in U.S. Appl. No. 14/217,824 dated Jun. 28, 2017, 28 pgs.

* cited by examiner

MANAGING PROCESSING ASSOCIATED WITH SELECTED ARCHITECTURAL FACILITIES

CROSS-REFERENCE TO RELATED APPLICATIONS

This application is a continuation of co-pending U.S. patent application Ser. No. 14/217,824, filed Mar. 18, 2014, entitled "MANAGING PROCESSING ASSOCIATED WITH SELECTED ARCHITECTURAL FACILITIES," which is hereby incorporated herein by reference in its entirety.

BACKGROUND

One or more aspects relate, in general, to processing within a computing environment, and in particular, to managing use of selected architectural functions within the computing environment.

Computing environments offer a range of capabilities and include certain functions as part of their architectural configurations. One such function is virtual address translation, such as dynamic address translation, used to translate virtual addresses to real addresses.

System configurations include physical memory used to store applications and data. The amount of physical memory is fixed and often inadequate to support the needs of users. Therefore, to provide additional memory or at least the appearance of additional memory, a memory management technique, referred to as virtual memory, is utilized. Virtual memory uses virtual addressing, which provides ranges of addresses that can appear to be much larger than the physical size of main memory.

To access main memory in a system configuration that includes virtual memory, a memory access is requested that includes, for instance, a virtual address. The virtual address is translated using, for instance, dynamic address translation or another translation technique, into a real address used to access the physical memory.

SUMMARY

Shortcomings of the prior art are overcome and advantages are provided through the provision of a method of managing processing within a computing environment. The method includes, for instance, initiating, by a host processor processing in a first architectural mode, a first guest virtual machine, the first guest virtual machine to process in the first architectural mode, the first architectural mode having a first instruction set architecture and providing a first set of architectural functions; initiating, by the host processor, a second guest virtual machine, the second guest virtual machine to process in a second architectural mode, wherein the second architectural mode has a second instruction set architecture and provides a second set of architectural functions, the second set of architectural functions being a reduced set of architectural functions provided in the first set of architectural functions, wherein a selected architectural function provided in the first set of architectural functions is absent from the second set of architectural functions, the second architectural mode being a function inhibit mode; and performing processing by the second guest virtual machine in the second architectural mode, wherein the performing processing overrides one or more controls associated with the selected architectural function that are defined to control execution of the second guest virtual machine.

Computer program products and systems relating to one or more embodiments are also described and may be claimed herein. Further, services relating to one or more embodiments are also described and may be claimed herein.

Additional features and advantages are realized. Other embodiments and aspects are described in detail herein and are considered a part of the claimed invention.

BRIEF DESCRIPTION OF THE SEVERAL VIEWS OF THE DRAWINGS

One or more aspects are particularly pointed out and distinctly claimed as examples in the claims at the conclusion of the specification. The foregoing and other objects, features, and advantages are apparent from the following detailed description taken in conjunction with the accompanying drawings in which:

DETAILED DESCRIPTION

Figure 1A:
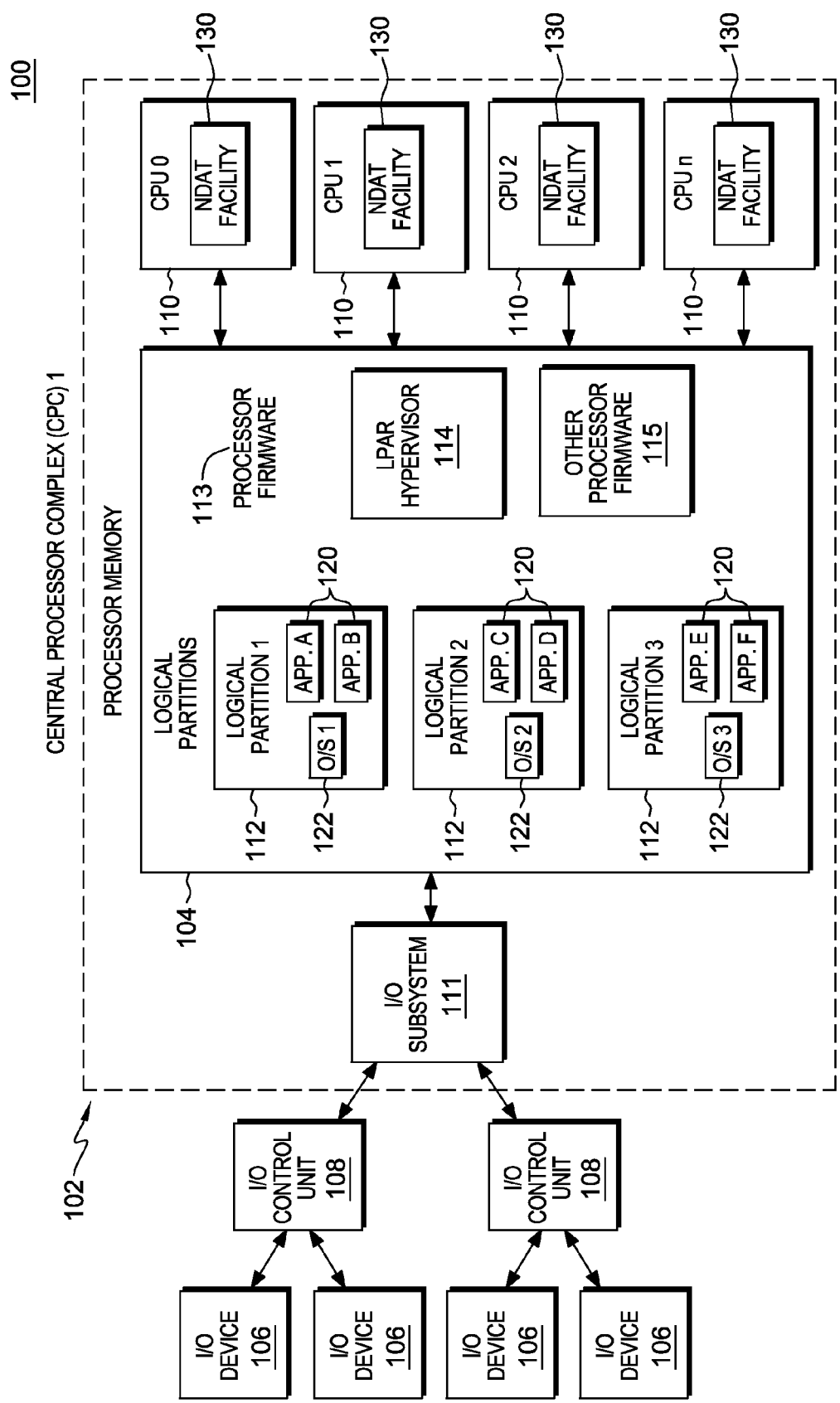
FIG. 1A depicts one example of a computing environment to incorporate and use one or more aspects of a No-DAT (No-Dynamic Address Translation) facility.

In accordance with one or more aspects, a facility is provided that, when installed, removes from an architecture a selected architectural function, such that the function is not able to be turned on/off regardless of other controls within the environment. When the facility is installed, the architectural function is not supported. It is as if it is no longer available in the architecture, and in fact, the code implementing the facility may have been deleted, bypassed, or otherwise eliminated. One such architectural function is virtual address translation, such as dynamic address translation (DAT), and the architecture is, for instance, ESA/390.

In one particular embodiment, a computing environment is provided that is configured to support a plurality of architectural modes, e.g., a first architectural mode, such as an enhanced mode, e.g., z/Architecture, and a second architectural mode, such as a legacy mode, e.g., ESA/390. In one embodiment, the first architectural mode has architectural differences from the second architectural mode, such as the first architectural mode provides 64-bit addressing and uses 64-bit general purposes registers, and the second architectural mode provides 31-bit addressing and uses 32-bit general purpose registers. Further, certain architectural functions, such as DAT, are supported by the first architectural mode and may not be supported by the second architectural mode.

While the computing environment is configured to concurrently support a plurality of architectural modes, it processes in only one of the modes. Thus, in accordance with an aspect, based on a processor of the computing environment receiving a request to perform an operation that uses a selected architectural function, the processor either performs the function or provides an indication that it is not performed, based on whether the function has been removed from the architectural mode in which the computing environment is currently processing.

In another embodiment, the computing environment is a virtual environment having a host control program executing on a processor and a plurality of guest virtual machines supported by the host. The host is processing, for instance, in a first architectural mode; however, guest virtual machines, initiated by the host may or may not process in the same architectural mode as the host. For instance, one virtual machine may be initiated in the first architectural mode, which provides the selected architectural function, and another virtual machine may be initiated in the second architectural mode, which does not provide the selected architectural function. In one embodiment, the second architectural mode provides a reduced set of the architectural functions of the first architectural mode. The selected architectural function is not a part of the architecture in that it has been removed from the architecture (e.g., a version of the architecture is created without code implementing the function, or the code that was previously in the architecture to support this function has been bypassed, deleted or otherwise eliminated).

In another embodiment, the second architectural mode may offer functions or facilities different from a first architecture, but specific architectural capabilities may be provided in the first architectural mode and not be provided in the second architectural mode. In one exemplary embodiment, DAT translation is provided in the first architecture, and not provided (in the form defined by the first architecture, or any other form, e.g., as may have been provided in accordance with one or more of an ESA/390, S/390, S/370, S/360, Power PC, Power PC in accordance with Book 3E, Intel/AMD x86, Itanium or any other architectural specification corresponding to a DAT or DAT-like facility) in a second architecture.

As indicated herein, in one example, the architectural function that is provided in the first architecture and not in the second architecture is virtual address translation, such as dynamic address translation (DAT). Thus, in one particular example, a No-DAT (also referred to as an NDAT) facility is provided in the computing environment that indicates that dynamic address translation is not supported by a particular architectural mode (e.g., the legacy architectural mode). The facility removes the possibility of, for instance, a configuration being in the ESA/390 architectural mode with dynamic address translation (DAT) on. That is, a configuration in the ESA/390 architectural mode cannot have DAT on, when this facility is installed and enabled. An attempt to turn on DAT causes, for instance, a No-DAT exception program interruption. In other embodiments, other exception codes are indicated.

In one embodiment, an NDAT facility also disables one or more instructions from being executed that are commonly used in conjunction with DAT translation, such as for example, the Load Real Address (LRA) instruction. The Load Real Address instruction is, for instance, prevented from being executed in a second architectural mode when it can be executed in a first architectural mode.

In one embodiment, the NDAT facility may be selectively enabled in one or more computing environments (e.g., processors, LPARs, guests). However, when it is enabled in a computing environment, the environment cannot use DAT in the second architecture (i.e., NO ESA/390 DAT) regardless of the settings of other controls within the environment. Those other controls are bypassed or overridden.

One example of a computing environment to incorporate and use one or more aspects of the No-DAT facility is described with reference to FIG. 1A. Referring to FIG. 1A, in one example, a computing environment 100 is based on the z/Architecture, offered by International Business Machines (IBM®) Corporation, Armonk, N.Y. The z/Architecture is described in an IBM Publication entitled "z/Architecture—Principles of Operation," Publication No. SA22-7932-09, 10$^{th}$ Edition, September 2012, which is hereby incorporated by reference herein in its entirety. Although the computing environment is based on the z/Architecture, in one embodiment, it also supports one or more other architectural configurations, such as ESA/390 or a subset of ESA/390.

Z/ARCHITECTURE, IBM, Z/VM and Z/OS (referenced below) are registered trademarks of International Business Machines Corporation, Armonk, N.Y. Other names used herein may be registered trademarks, trademarks or product names of International Business Machines Corporation or other companies.

As one example, computing environment 100 includes a central processor complex (CPC) 102 coupled to one or more input/output (I/O) devices 106 via one or more control units 108. Central processor complex 102 includes, for instance, a processor memory 104 (a.k.a., main memory, main storage, central storage) coupled to one or more central processors (a.k.a., central processing units (CPUs)) 110, and an input/output subsystem 111, each of which is described below.

Processor memory 104 includes, for example, one or more partitions 112 (e.g., logical partitions), and processor firmware 113, which includes a logical partition hypervisor 114 and other processor firmware 115. One example of logical partition hypervisor 114 is the Processor Resource/System Manager (PR/SM), offered by International Business Machines Corporation, Armonk, N.Y.

A logical partition functions as a separate system and has one or more applications 120, and optionally, a resident operating system 122 therein, which may differ for each logical partition. In one embodiment, the operating system is the z/OS operating system, the z/VM operating system, the z/Linux operating system, or the TPF operating system, offered by International Business Machines Corporation, Armonk, N.Y. Logical partitions 112 are managed by logical partition hypervisor 114, which is implemented by firmware running on processors 110. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Central processors 110 are physical processor resources allocated to the logical partitions. In particular, each logical partition 112 has one or more logical processors, each of which represents all or a share of a physical processor 110 allocated to the partition. The logical processors of a particular partition 112 may be either dedicated to the partition, so that the underlying processor resource 110 is reserved for that partition; or shared with another partition, so that the underlying processor resource is potentially available to another partition. In one example, one or more of the CPUs include aspects of a No-DAT (NDAT) facility 130 described herein.

Input/output subsystem 111 directs the flow of information between input/output devices 106 and main storage 104. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can be used.

The I/O subsystem uses one or more input/output paths as communication links in managing the flow of information to or from input/output devices 106. In this particular example, these paths are called channel paths, since the communication adapters are channels.

Figure 1B:
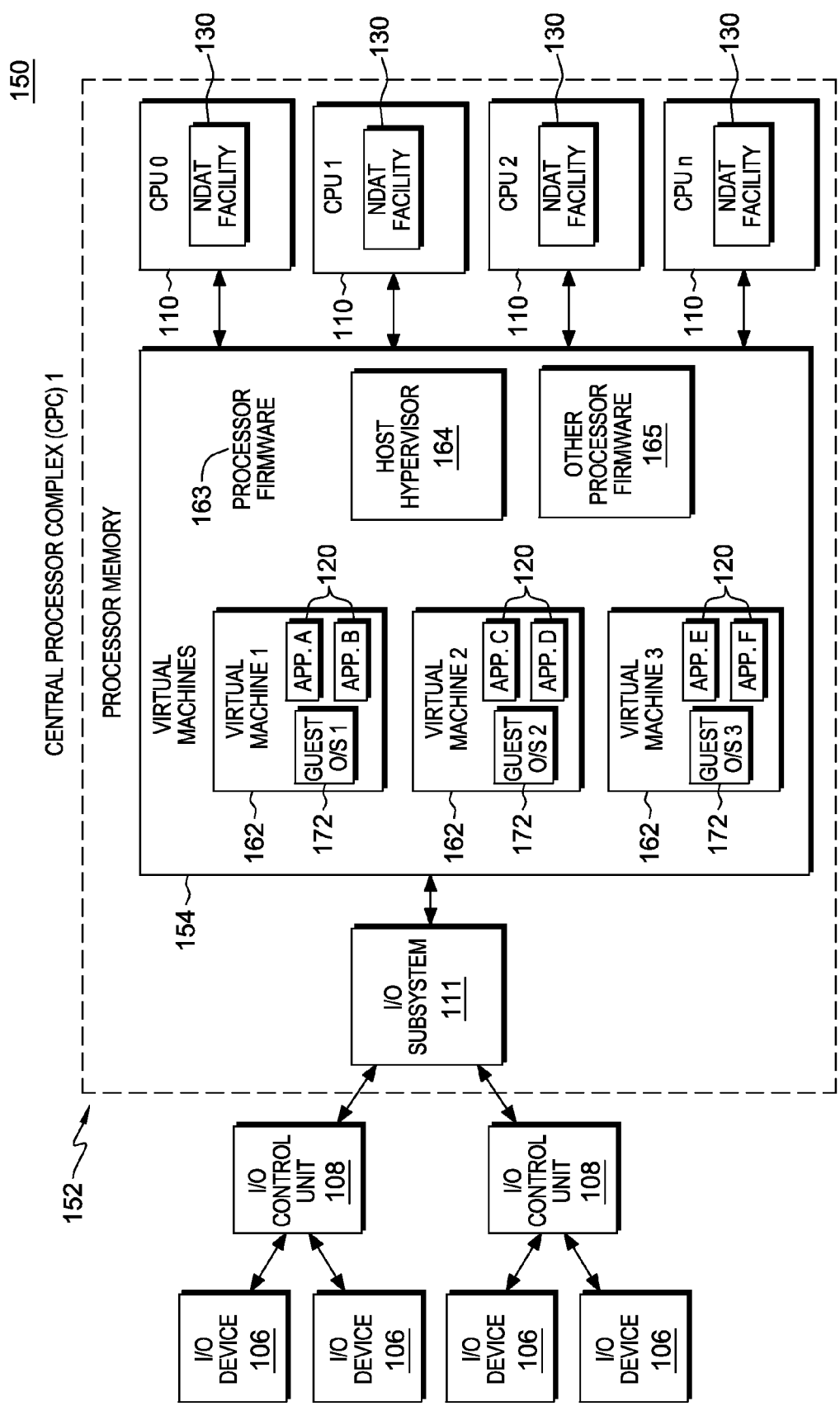
FIG. 1B depicts one example of a virtual computing environment to incorporate and use one or more aspects of a No-DAT facility.

Another example of a computing environment to incorporate and use one or more aspects of the No-DAT facility is described with reference to FIG. 1B. In this example, a computing environment 150 includes a central processor complex 152 providing virtual machine support. CPC 152 is coupled to one or more input/output (I/O) devices 106 via one or more control units 108. Central processor complex 152 includes, for instance, a processor memory 154 (a.k.a., main memory, main storage, central storage) coupled to one or more central processors (a.k.a., central processing units (CPUs)) 110, and an input/output subsystem 111.

Processor memory 154 includes, for example, one or more virtual machines 162, and processor firmware 163, which includes a host hypervisor 164 and other processor firmware 165. One example of host hypervisor 164 is z/VM®, offered by International Business Machines Corporation, Armonk, N.Y.

The virtual machine support of the CPC provides the ability to operate large numbers of virtual machines 162, each capable of hosting a guest operating system 172, such as Linux. Each virtual machine 162 is capable of functioning as a separate system. That is, each virtual machine can be independently reset, host a guest operating system, and operate with different programs 120. An operating system or application program running in a virtual machine appears to have access to a full and complete system, but in reality, only a portion of it is available.

In this particular example, the model of virtual machines is a V=V model, in which the absolute or real memory of a virtual machine is backed by host virtual memory, instead of real or absolute memory. Each virtual machine has a virtual linear memory space. The physical resources are owned by host 164, and the shared physical resources are dispatched by the host to the guest operating systems, as needed, to meet their processing demands. This V=V virtual machine (i.e., pageable guest) model assumes that the interactions between the guest operating systems and the physical shared machine resources are controlled by the host, since the large number of guests typically precludes the host from simply partitioning and assigning the hardware resources to the configured guests. One or more aspects of a V=V model are further described in an IBM® publication entitled "z/VM: Running Guest Operating Systems," IBM® Publication No. SC24-5997-02, October 2001, which is hereby incorporated by reference herein in its entirety.

Central processors 110 are physical processor resources that are assignable to a virtual machine. For instance, virtual machine 162 includes one or more logical processors, each of which represents all or a share of a physical processor resource 110 that may be dynamically allocated to the virtual machine. Virtual machines 162 are managed by host 164.

In one embodiment, the host (e.g., z/VM®) and processor (e.g., System z) hardware/firmware interact with each other in a controlled cooperative manner in order to process V=V guest operating system operations without requiring transfer of control from/to the guest operating system and the host. Guest operations can be executed directly without host intervention via a facility that allows instructions to be interpretively executed for a pageable storage mode guest. This facility provides an instruction, Start Interpretive Execution (SIE), which the host can issue, designating a control block called a state description which holds guest (virtual machine) state and controls, such as execution controls and mode controls. The instruction places the machine into an interpretive-execution mode in which guest instructions and interruptions are processed directly, until a condition requiring host attention arises. When such a condition occurs, interpretive execution is ended, and either a host interruption is presented, or the SIE instruction completes storing details of the condition encountered; this latter action is called interception. One example of interpretive execution is described in System/370 Extended Architecture/Interpretive Execution, IBM Publication No. SA22-7095-01, September 1985, which is hereby incorporated by reference herein in its entirety.

In particular, in one embodiment, the interpretative execution facility provides an instruction for the execution of virtual machines. This instruction, called Start Interpretative Execution (SIE), is issued by a host which establishes a guest execution environment. The host is the control program directly managing the real machine and a guest refers to any virtual or interpreted machine. The machine is placed in the interpretative execution mode by the host, which issues the SIE instruction. In this mode, the machine provides the functions of a selected architecture (e.g., z/Architecture, ESA/390). The functions include, for instance, execution of privileged and problem program instructions, address translation, interruption handling, and timing among other things. The machine is said to interpret the functions that it executes in the context of the virtual machine.

The SIE instruction has an operand, called the state description, which includes information relevant to the current state of the guest. When execution of SIE ends, information representing the state of the guest, including the guest PSW, is saved in the state description before control is returned to the host.

The interpretative execution architecture provides a storage mode for absolute storage referred to as a pageable storage mode. In pageable storage mode, dynamic address translation at the host level is used to map guest main storage. The host has the ability to scatter the real storage of pageable storage mode guests to usable frames anywhere in host real storage by using the host DAT, and to page guest data out to auxiliary storage. This technique provides flexibility when allocating real machine resources while preserving the expected appearance of a contiguous range of absolute storage for the guest.

A virtual machine environment may call for application of DAT twice: first at the guest level, to translate a guest virtual address through guest managed translation tables into a guest real address, and then, for a pageable guest, at the host level, to translate the corresponding host virtual address to a host real address.

In certain cases, the host is to intercede in operations normally delegated to the machine. For this purpose, the state description includes controls settable by the host to "trap," or intercept, specific conditions. Interception control bits request that the machine return control to host simulation when particular guest instructions are encountered. Intervention controls capture the introduction of an enabled state into the PSW, so that the host can present an interruption which it holds pending for the guest. Intervention controls may be set asynchronously by the host on another real processor while interpretation proceeds. The machine periodically refetches the controls from storage, so that updated values will be recognized. Guest interruptions can thereby be made pending without prematurely disturbing interpretation.

In one embodiment, for virtual environments, an execution control indicator is provided in the SIE state description. In general, if the indicator for this architectural function is zero, the function is not made available in a virtual machine, and if the indicator is one, interpretative execution of the associated function is attempted. In one example, when a pageable storage mode guest is in the ESA/390 architectural mode and the indicator is one, the NDAT facility is installed in the guest; when zero, NDAT is not installed. When NDAT is installed, the guest is not to use DAT, regardless of other controls (e.g., other controls or facilities controlling execution in virtual environments) that may govern the availability of the DAT function. (In another embodiment, NDAT is provided in a virtual environment as a global facility without provision of a specific indicator.)

In addition to the execution controls, mode controls in the state description specify whether the guest is executed in the ESA/390 or z/Architecture mode and selects one of a plurality of ways to represent guest main storage of a guest virtual machine in host storage. In accordance with one embodiment, a control bit is provided in a state control to select between a guest in a first and a second architectural mode (e.g., z/Architecture and ESA/390, respectively). In accordance with another embodiment, two distinct instructions may provide a host with the ability to create a first and a second guest virtual machine, e.g., distinct instructions SIEz and SIEe may be provided to start guest machines in a z/Architecture and ESA/390 mode, respectively.

The SIE instruction runs a virtual server dispatched by the control program until the server's time slice has been consumed or until the server wants to perform an operation that the hardware cannot virtualize or for which the control program is to regain control. At that point, the SIE instruction ends and control is returned to the control program, which either simulates the instruction or places the virtual server in an involuntary wait state. When complete, the control program again schedules the virtual server to run, and the cycle starts again. In this way, the full capabilities and speed of the CPU are available to the virtual server. Only those privileged instructions that require assistance from or validation by the control program are intercepted. These SIE intercepts, as they are known as, are also used by the control program to impose limits on the operations a virtual server may perform on a real device.

Further details regarding SIE are described in ESA/390 interpretive-execution architecture, foundation for VM/ESA, Osisek et al., IBM Systems Journal, Vol. 30, No. 1, January 1991, pp. 34-51, which is hereby incorporated by reference herein in its entirety.

In one embodiment, the NDAT facility is installed automatically in ESA/390 guests without reference to any controls. Thus, without reference to any controls in a SIE state control block, or other option to a SIE or other virtual machine-creating instruction, a virtual machine corresponding to ESA/390 mode has no access to DAT facilities.

Figure 2:
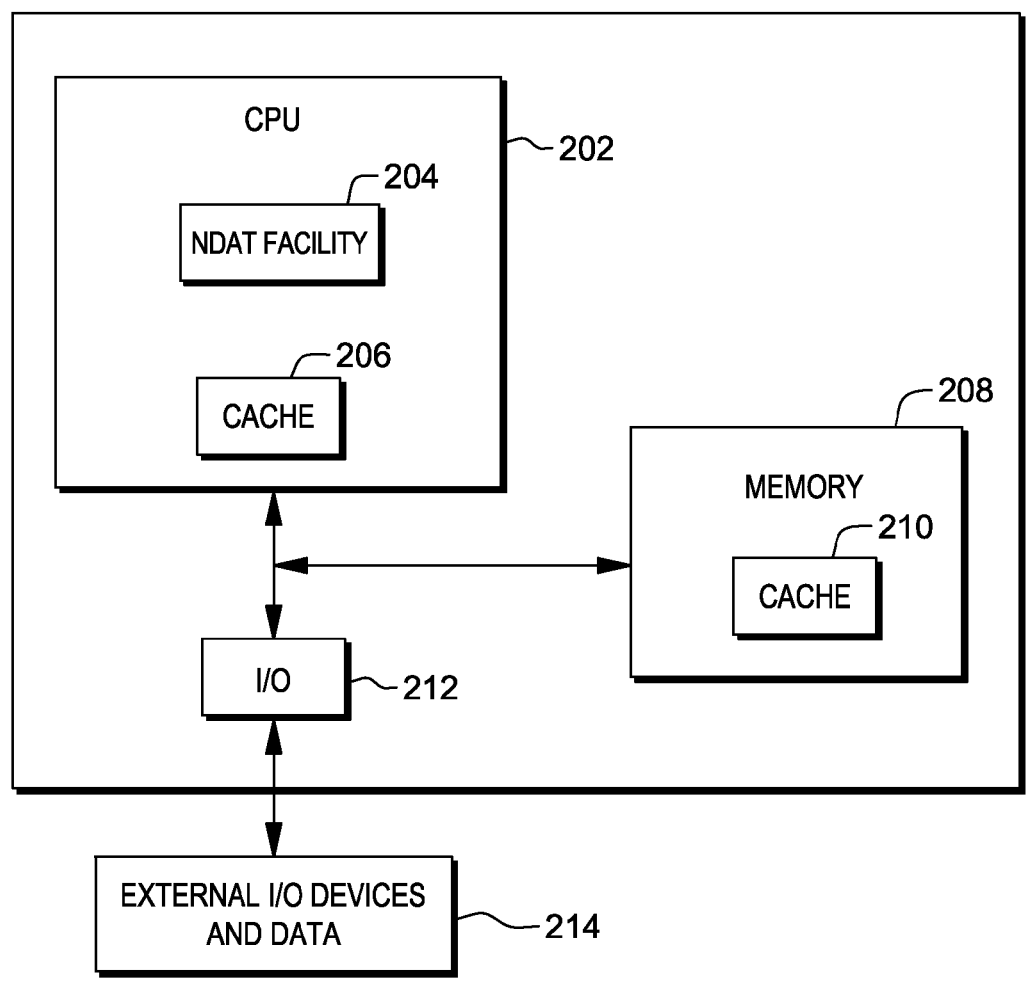
FIG. 2 depicts another example of a computing environment to incorporate and use one or more aspects of a No-DAT facility.

A further example of a computing environment to incorporate and use one or more aspects of the No-DAT facility is described with reference to FIG. 2. In this example, a computing environment 200 includes a non-partitioned environment that is configured for a plurality of architectural modes, including z/Architecture and ESA/390 or a subset of ESA/390. It includes, e.g., a processor (central processing unit—CPU) 202 that includes, for instance, No-DAT (NDAT) facility 204, and one or more caches 206. Processor 202 is communicatively coupled to a memory portion 208 having one or more caches 210, and to an input/output (I/O) subsystem 212. I/O subsystem 212 is communicatively coupled to external I/O devices 214 that may include, for example, data input devices, sensors and/or output devices, such as displays.

Another embodiment of a computing environment to incorporate and use one or more aspects of the No-DAT facility is described with reference to FIG. 3A. In this example, a computing environment 300 includes, for instance, a native central processing unit (CPU) 302, a memory 304, and one or more input/output devices and/or interfaces 306 coupled to one another via, for example, one or more buses 308 and/or other connections. As examples, computing environment 300 may include a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 302 includes one or more native registers 310, such as one or more general purpose registers and/or one or more special purpose registers used during processing within the environment, as well as a No-DAT facility 311. These registers include information that represents the state of the environment at any particular point in time.

Moreover, native central processing unit 302 executes instructions and code that are stored in memory 304. In one particular example, the central processing unit executes emulator code 312 stored in memory 304. This code enables the computing environment configured in one architecture to emulate one or more other architectures. For instance, emulator code 312 allows machines based on architectures other than the z/Architecture, such as PowerPC processors, Power Systems servers, HP Superdome servers or others, to emulate the z/Architecture (and/or ESA/390) and to execute software and instructions developed based on the z/Architecture.

Further details relating to emulator code 312 are described with reference to FIG. 3B. Guest instructions 350 stored in memory 304 comprise software instructions (e.g., correlating to machine instructions) that were developed to be executed in an architecture other than that of native CPU 302. For example, guest instructions 350 may have been designed to execute on a z/Architecture processor 202, but instead, are being emulated on native CPU 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native CPU 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native central processing unit 302. In other examples, one or more of the routines or operations are implemented in firmware, hardware, software or some combination thereof. The registers of the emulated processor may be emulated using registers 310 of the native CPU or by using locations in memory 304. In embodiments, guest instructions 350, native instructions 356 and emulator code 312 may reside in the same memory or may be disbursed among different memory devices.

Figure 3A:
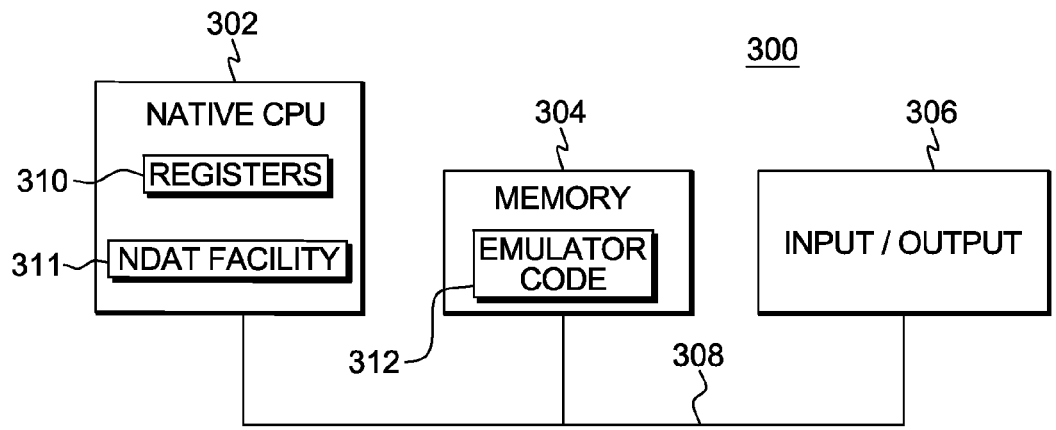
FIG. 3A depicts yet another example of a computing environment to incorporate and use one or more aspects of a No-DAT facility.
Figure 3B:
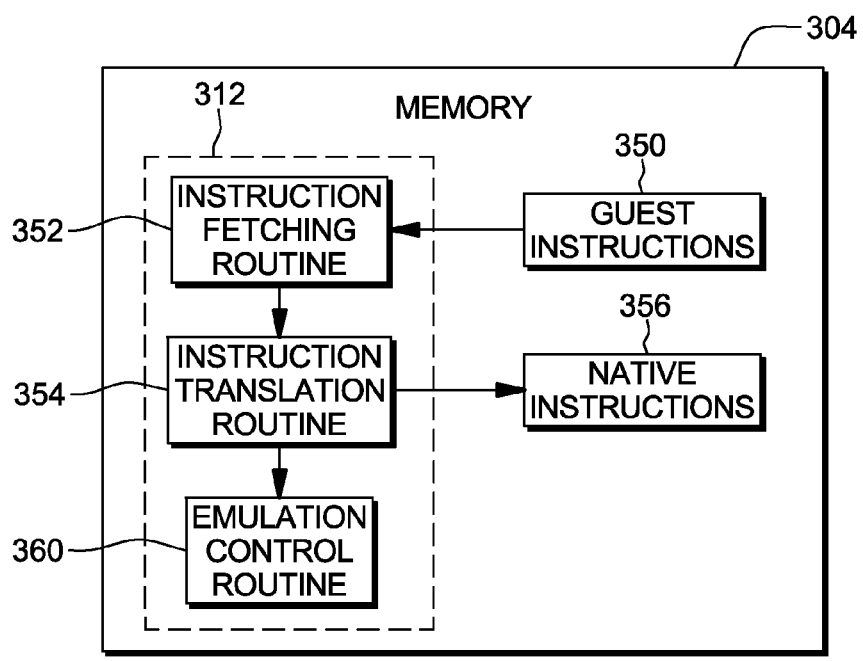
FIG. 3B depicts further details of the memory of FIG. 3A.

In accordance with at least one embodiment of an emulation system of FIGS. 3A and 3B, an emulator for a system with the NDAT facility installed for a second architecture (e.g., ESA/390) but not for a first architecture (e.g., z/Architecture) contains emulation routines to implement DAT translation for the z/Architecture mode, and does not contain emulation routines to implement DAT translation for the ESA/390 architecture mode. Instead, emulator code 312 for the second architectural mode includes tests to determine whether an emulated program executing in the second architecture mode is attempting to enable DAT translation, and if so, to directly generate one or more error indications. In another embodiment, when common code routines are used to implement a first and second architecture, when DAT related functions are invoked by a program, a first test is performed to determine a current architectural mode. If the current architectural mode corresponds to a first architectural mode, control transfers to code implementing DAT for a first architectural mode. When a current mode corresponds to a second architectural mode, control transfers to an error routine and code corresponding to the enablement of DAT translation or the performance of DAT translation is invoked.

In accordance with at least one embodiment, a number of instructions (e.g., LRA) are used in conjunction with DAT, and are optionally disabled in a second architectural mode, when the NDAT facility is installed. In accordance with at least one embodiment, emulator code 312 does not contain code to emulate an instruction corresponding to a disabled instruction used in conjunction with DAT in a second architectural mode. In accordance with one such embodiment, emulator code 312 does contain code to emulate an instruction corresponding to an instruction used in conjunction with DAT in a first architectural mode. In another embodiment, when common code routines are used to implement a first and second architecture, when instructions used in conjunction with DAT related functions are invoked by a program, a first test is performed to determine a current architectural mode. If the current mode corresponds to a first architectural mode, control transfers to code implementing such instructions for a first architectural mode. When a current mode corresponds to a second architectural mode, control transfers to an error routine and code corresponding to instructions used in conjunction with DAT translation or the performance of DAT translation is invoked.

The computing environments described above are only examples of computing environments that can be used. Other environments, including but not limited to, other non-partitioned environments, other partitioned environments, and/or other emulated environments, may be used; embodiments are not limited to any one environment. Further, although examples of specific architectures are described herein and particular architectural differences and different architectural functions are described, these are only examples. Other architectures may be used, other architectural differences may exist, and/or other architectural functions may or may not be supported by one or more of the architectures.

In one embodiment, each computing environment is configured to support multiple architectures, such as a first architecture (e.g., z/Architecture) that offers a first set of architectural functions, including but not limited to, dynamic address translation; and a second architecture (e.g., ESA/390) that offers a second set of architectural functions. The second set of architectural functions is a reduced set of functions, in that one or more of the functions, such as DAT, included in the first set of architectural functions are absent from the second set of architectural functions.

Dynamic address translation (DAT) provides the ability to interrupt the execution of a program at an arbitrary moment, record it and its data in auxiliary storage, such as a direct access storage device, and at a later time return the program and the data to different main storage locations for resumption of execution. The transfer of the program and its data between main and auxiliary storage may be performed piecemeal, and the return of the information to main storage may take place in response to an attempt by the CPU to access it at the time it is needed for execution. These functions may be performed without change or inspection of the program and its data, do not require any explicit programming convention for the relocated program, and do not disturb the execution of the program except for the time delay involved.

With appropriate support by an operating system, the dynamic address translation facility may be used to provide to a user a system wherein storage appears to be larger than the main storage which is available in the configuration. This apparent main storage is referred to as virtual storage, and the addresses used to designate locations in the virtual storage are referred to as virtual addresses. The virtual storage of a user may far exceed the size of the main storage which is available in the configuration and normally is maintained in auxiliary storage. The virtual storage is considered to be composed of blocks of addresses, called pages. Only the most recently referred-to pages of the virtual storage are assigned to occupy blocks of physical main storage. As the user refers to pages of virtual storage that do not appear in main storage, they are brought in to replace pages in main storage that are less likely to be needed. The swapping of pages of storage may be performed by the operating system without the user's knowledge.

The sequence of virtual addresses associated with a virtual storage is called an address space. With appropriate support by an operating system, the dynamic address translation facility may be used to provide a number of address spaces. These address spaces may be used to provide degrees of isolation between users. Such support can include a completely different address space for each user, thus providing complete isolation, or a shared area may be provided by mapping a portion of each address space to a single common storage area. Also instructions are provided which permit a semi-privileged program to access more than one such address space. Dynamic address translation provides for the translation of, for instance, virtual addresses from multiple different address spaces without requiring that the translation parameters in the control registers be changed. These address spaces are called the primary address space, secondary address space, and AR-specified address spaces. A privileged program can also cause the home address space to be accessed.

In the process of replacing blocks of main storage by new information from an external medium, it is to be determined which block to replace and whether the block being replaced should be recorded and preserved in auxiliary storage. To aid in this decision process, a reference bit and a change bit are associated with the storage key.

Dynamic address translation may be specified for instruction and data addresses generated by the CPU.

Address computation can be carried out in the 24-bit, 31-bit, or 64-bit addressing mode. When address computation is performed in the 24-bit or 31-bit addressing mode, 40 or 33 zeros, respectively, are appended on the left to form a 64-bit address. Therefore, the resultant logical address is 64 bits in length. The real or absolute address that is formed by dynamic address translation, and the absolute address that is then formed by prefixing, in one embodiment, are 64 bits in length.

Dynamic address translation is the process of translating a virtual address during a storage reference into the corresponding real or absolute address. The virtual address may be a primary virtual address, secondary virtual address, AR (Access Register)-specified virtual address, or home virtual address. The addresses are translated by means of the primary, the secondary, an AR-specified, or the home address space control element, respectively. After selection of the appropriate address space control element, the translation process is the same for all of the four types of virtual address. An address space control element may be a segment table designation specifying a 2G-byte address space, a region table designation specifying a 4T-byte, 8P-byte, or 16E-byte space, or a real-space designation specifying a 16E-byte space. (The letters K, M, G, T, P and E represent kilo $2^{10}$; mega; gga, $2^{30}$; tera, $2^4$ eta $2^{50}$; and exa, $2^{60}$, respectively.) A segment table designation or region table designation causes translation to be performed by means of tables established by the operating system in real or absolute storage. A real space designation causes the virtual address simply to be treated as a real address, without the use of tables in storage.

In the process of translation when using a segment table designation or a region table designation, three types of units of information are recognized—regions, segments, and pages. A region is a block of sequential virtual addresses spanning, for instance, 2G bytes and beginning at a 2G-byte boundary. A segment is a block of sequential virtual addresses spanning, for instance, 1M bytes and beginning at a 1M-byte boundary. A page is a block of sequential virtual addresses spanning, for instance, 4K bytes and beginning at a 4K-byte boundary.

The virtual address, accordingly, is divided into four principal fields. Bits 0-32 are called the region index (RX), bits 33-43 are called the segment index (SX), bits 44-51 are called the page index (PX), and bits 52-63 are called the byte index (BX).

As determined by its address space control element, a virtual address space may be a 2G-byte space including one region, or it may be up to a 16E-byte space including up to 8G regions. The RX part of a virtual address applying to a 2G-byte address space is to be all zeros; otherwise, an exception is recognized, in one example.

The RX part of a virtual address is itself divided into three fields. Bits 0-10 are called the region first index (RFX), bits 11-21 are called the region second index (RSX), and bits 22-32 are called the region third index (RTX).

Figure 4:
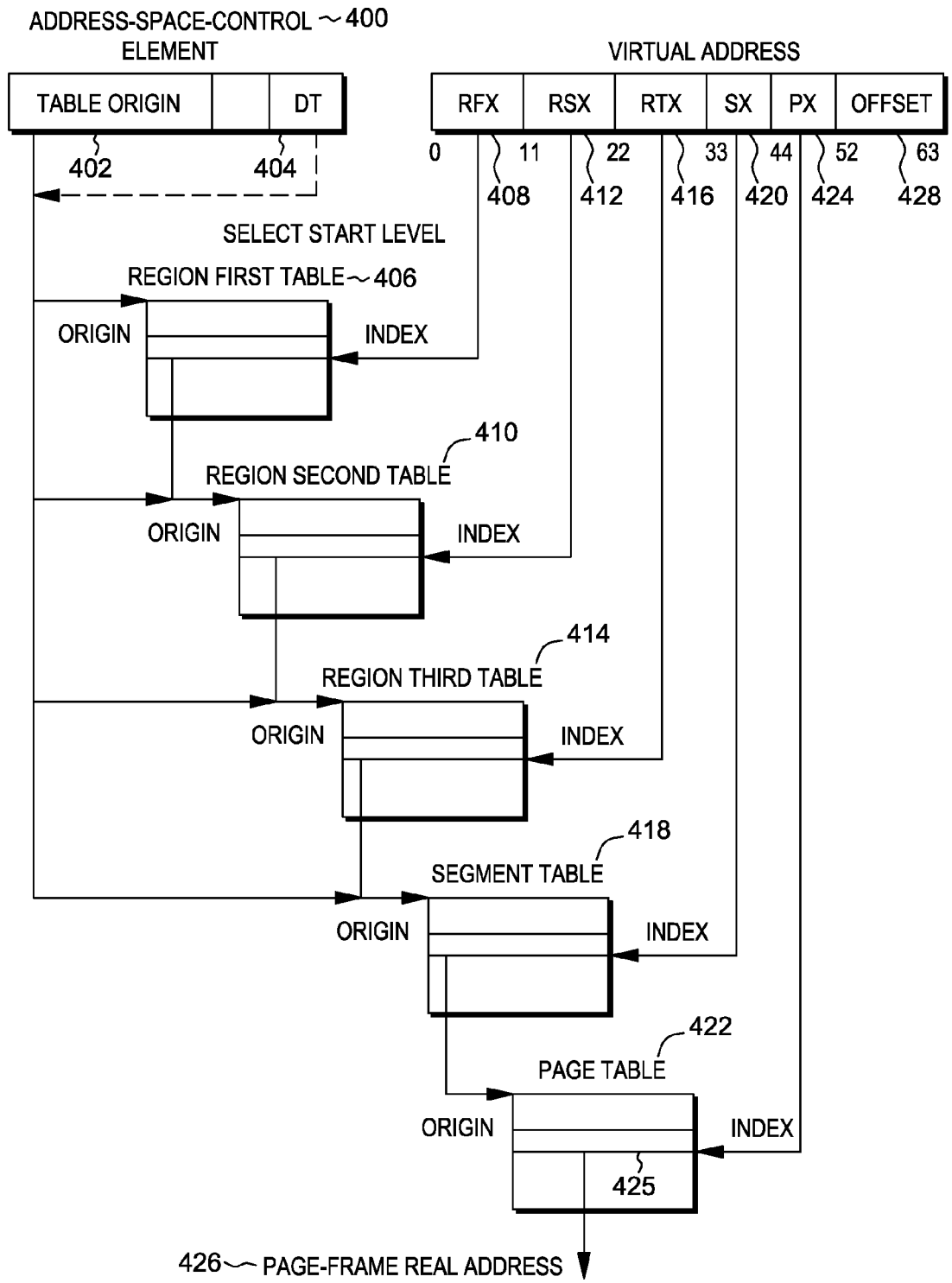
FIG. 4 depicts one embodiment of a 64-bit address translation.

One example of translating a virtual address to a real address is described with reference to FIG. 4. In this example, an address space control element 400 includes a table origin 402, as well as a designation type (DT) control 404, which is an indication of a start level for translation (i.e., an indication at which level in the hierarchy address translation is to begin). Using table origin 402 and DT 404, the origin of a particular table is located. Then, based on the table, bits of the virtual address are used to index into the specific table to obtain the origin of the next level table. For instance, if the region first table 406 is selected, then bits 0-10 (RFX) 408 of the virtual address are used to index into the region first table to obtain an origin of a region second table 410. Then, bits 11-21 (RSX) 412 of the virtual address are used to index into region second table 410 to obtain an origin of a region third table 414. Similarly, bits 22-32 (RTX) 416 of the virtual address are used to index into region third table 414 to obtain an origin of a segment table 418. Then, bits 33-43 (SX) 420 of the virtual address are used to index into segment table 418 to obtain an origin of page table 422, and bits 44-51 (PX) 424 of the virtual address are used to index into page table 422 to obtain a page table entry (PTE) 425 having a page frame real address 426. The page frame real address is then combined (e.g., concatenated) with offset 428 (bits 52-63) to obtain a real address.

As described herein, in one aspect, the dynamic address translation facility is not included in a set of available functions provided by a selected architecture. In particular, in one example, a No-DAT facility is provided, that indicates DAT is not supported. The No-DAT facility may be provided in a computing environment by installing the facility and optionally, setting an indicator, such as a facility bit, e.g., bit 140, indicating it is installed. In one example, if the bit is set to one, then the facility is installed. Although in one embodiment, the facility is enabled via a facility bit, in other embodiments, it may be enabled by other mechanisms. For instance, in an environment having virtual guests, the facility may be enabled by default.

Further, the No-DAT facility may be provided by offering a subset or a reduced set of the selected architecture that does not include the DAT facility. In this environment, there may not be any explicit indication that it is not supported, it is just absent from the architecture. In one embodiment, the No-DAT facility (also referred to as NDAT, ESA/390-No-DAT or 390NDAT) may be available on a model implementing the z/Architecture. The facility removes the possibility of a configuration being in the ESA/390 architectural mode with dynamic address translation (DAT) on. That is, a configuration in the ESA/390 architectural mode cannot have DAT on, when the NDAT facility is provided. An attempt to turn on DAT causes a No-DAT exception program interruption, in one embodiment. In other embodiments, other program interruption codes, or other ways of indicating an error are provided. In yet another embodiment, an error is not indicated, but DAT remains disabled.

In one embodiment, the enabling of the No-DAT facility in a processor configured for the facility is an option; while in other embodiments, it is automatically installed and enabled on all processors of a computing environment (or selected processors, in yet another embodiment). In one particular embodiment, the No-DAT facility is to be installed in guest—2 configurations (a second level guest in which the guest is initialized by another guest). In such a configuration, if the guest-2 is initialized in ESA/390, it will not be able to use DAT; although, guest-1 and host processors may be initialized in z/Architecture, and therefore, have use of DAT. Further, in one embodiment, a guest-1 or host may be initiated in ESA/390 and the No-DAT facility is not enabled. Thus, the guest-1 or host may use DAT, while No-DAT is installed for guest-2, and therefore, guest-2 cannot use DAT when in ESA/390.

When the No-DAT facility is installed on a computing environment that supports multiple architectural modes, DAT may be performed when the environment is in a first architectural mode, such as the z/Architecture architectural mode, but not when the environment is in a second architectural mode, such as the ESA/390 architectural mode. Any attempt to perform DAT when in the ESA/390 architectural mode and NDAT is provided results in, e.g., a No-DAT exception program interruption, in one example. In other embodiments, another program interruption is used to indicate an error. In yet another embodiment, no error is indicated, and execution proceeds, but DAT is not enabled.

As indicated herein, a No-DAT exception is recognized when the dynamic address translation function is not provided in the configuration and an attempt to turn DAT on or perform DAT is made.

The exception is recognized in the following cases, as examples:

1. An attempt is made to turn DAT on by execution of a LOAD PSW instruction. The value to be loaded is not checked before changing the PSW.
2. A LOAD REAL ADDRESS instruction is executed. Execution is suppressed and the instruction-length code is set to 2.
3. An attempt is made to turn DAT on by execution of a SET SYSTEM MASK instruction. The value to be set is not checked before changing the current PSW.
4. An attempt is made to turn DAT on by execution of a STORE THEN OR SYSTEM MASK instruction. The value to be ORed to the system mask is not checked before changing the system mask of the current PSW.
5. Similar to case 1, an interruption occurs and the interruption-new PSW has bit position 5 as a one.

Figure 5:
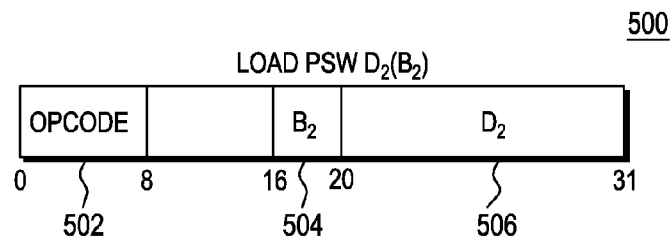
FIG. 5 depicts one example format of a Load Program Status Word (PSW) instruction.

Each of the above cases is further described below:

Further details regarding a Load PSW instruction are described with reference to FIG. 5. In one embodiment, a Load PSW instruction 500 includes an operation code field 502 that includes an operation code (opcode) to indicate a load PSW operation; a base field ($B_2$) 504; and a displacement field ($D_2$) 506. Contents of the general register designated by the $B_2$ field are added to the contents of the $D_2$ field to form an address of a second operand in storage (referred to as the second operand address).

In operation of the Load PSW instruction, the current PSW is replaced by a 16-byte PSW formed from the contents of the doubleword at the location designated by the second operand address.

Bit 12 of the doubleword is to be one; otherwise, a specification exception may be recognized, depending on the model. If a Configuration z/Architecture Architectural Mode (CZAM) facility is installed, then a specification exception is recognized if bit 12 of the doubleword is not one. In one embodiment, the CZAM facility reconfigures a computing environment (e.g., processor, LPAR, guest) such that one or more aspects of an architecture, such as ESA/390, in a multi-architecture supported environment is no longer supported. Installation of CZAM affects certain processes of the computing environment, such as power-on, reset, etc. For instance, if CZAM is installed and enabled, then a power-on or reset sequence initiates z/Architecture, rather than, for instance, ESA/390. Aspects of CZAM are described in co-filed, commonly assigned application entitled "Architectural Mode Configuration," Gainey et al., (IBM Docket No. POU920140021US1), which is hereby incorporated by reference herein in its entirety.

Bits 0-32 of the doubleword, except with bit 12 inverted, are placed in positions 0-32 of the current PSW. Bits 33-63 of the doubleword are placed in positions 97-127 of the current PSW. Bits 33-96 of the current PSW are set to zero.

A serialization and checkpoint synchronization function is performed before or after the operand is fetched and again after the operation is completed.

The operand is to be designated on a doubleword boundary; otherwise, a specification exception is recognized. A specification exception may be recognized if bit 12 of the operand is zero, depending on the model.

The PSW fields which are to be loaded by the instruction are not checked for validity before they are loaded, except for the checking of bit 12. However, immediately after loading, a specification exception is recognized, and a program interruption occurs, when any of the following is true for the newly loaded PSW:

Any of bits 0, 2-4, 12, or 24-30 is a one.

Bits 31 and 32 are both zero, and bits 97-103 are not all zeros.

Bits 31 and 32 are one and zero, respectively.

In these cases, the operation is completed, and the resulting instruction length code is 0.

The operation is suppressed on all addressing and protection exceptions.

Resulting Condition Code: The code is set as specified in the new PSW Loaded.

Program Exceptions:
Access (fetch, operand 2)
Privileged operation
Specification Programming Note: The second operand should have the format of an ESA/390 PSW, an example of which is described below. A specification exception will be recognized during or after the execution of LOAD PSW if bit 12 of the operand is zero.

Further details regarding the PSW are described in "Development and Attributes of z/Architecture," Plambeck et al., IBM J. Res. & Dev., Vol. 46, No. 4/5, July/September 2002, which is hereby incorporated by reference herein in its entirety.

Figure 6:
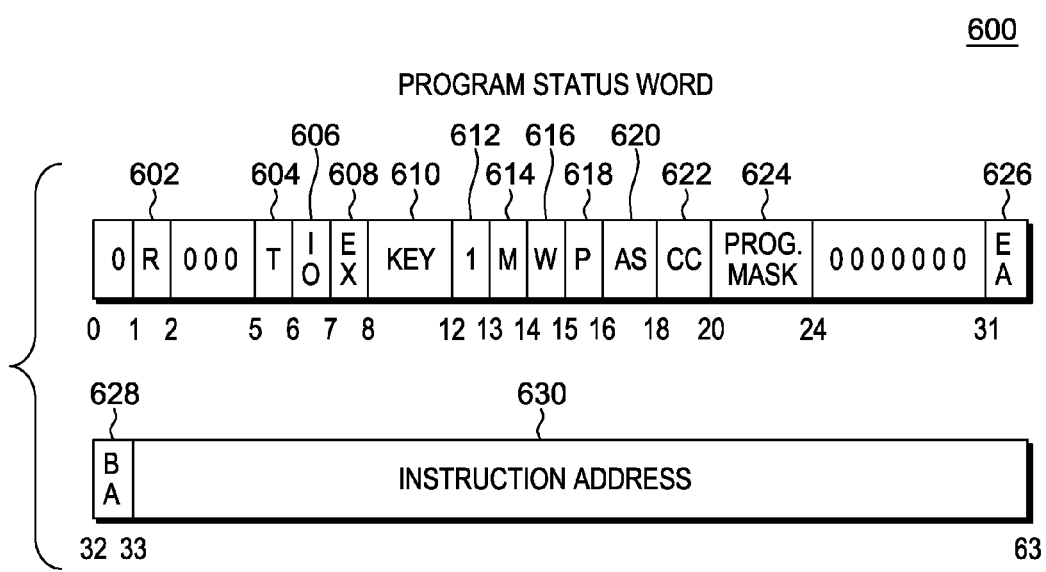
FIG. 6 depicts one example format of a program status word.

One embodiment of a format of a program status word (PSW) is described with reference to FIG. 6. Referring to FIG. 6, in this example, the format of the program status word is an ESA/390 format, except that bit 31 is shown as EA, as indicated below.

In one embodiment, a program status word 600 includes the following fields, as one example:

Per Mask (R) 602: Bit 1 controls whether the CPU is enabled for interruptions associated with program event recording (PER). When the bit is zero, no PER event can cause an interruption. When the bit is one, interruptions are permitted, subject to the PER event mask bits in control register 9;

DAT Mode (T) 604: Bit 5 controls whether implicit dynamic address translation (DAT) of logical and instruction addresses used to access storage takes place. When the bit is zero, DAT is off, and logical and instruction addresses are treated as real addresses. When the bit is one, DAT is on, and the dynamic address translation mechanism is invoked.

I/O Mask (IO) 606: Bit 6 controls whether the CPU is enabled for I/O interruptions. When the bit is zero, an I/O interruption cannot occur. When the bit is one, I/O interruptions are subject to the I/O interruption subclass mask bits in control register 6. When an I/O interruption subclass mask bit is zero, an I/O interruption for that I/O interruption subclass cannot occur; when the I/O interruption subclass mask bit is one, an I/O interruption for that I/O interruption subclass can occur;

External Mask (EX) 608: Bit 7 controls whether the CPU is enabled for interruption by conditions included in the external class. When the bit is zero, an external interruption cannot occur. When the bit is one, an external interruption is subject to the corresponding external subclass mask bits in control register 0. When the subclass mask bit is zero, conditions associated with the subclass cannot cause an interruption. When the subclass mask bit is one, an interruption in that subclass can occur.

PSW Key (Key) 610: Bits 9-11 form the access key for storage references by the CPU. If the reference is subject to key-controlled protection, the PSW key is matched with a storage key when information is stored or when information is fetched from a location that is protected against fetching. However, for one of the operands of each of Move to Primary, Move to Secondary, Move with Key, Move with Source Key, and Move with Destination Key, and for either or both operands of Move with Optional Specifications, an access key specified as an operand is used instead of the PSW key.

Bit 12 612: This bit indicates the current architectural mode. It is set to one for the ESA/390 PSW format. For the z/Architecture PSW format, this bit is defined to be zero. When in z/Architecture mode, a load PSW extended (LPSWE) instruction is defined for loading a true z/Architecture PSW (which has a different format than the format described herein, including having an instruction address in bits 64-127). However, an ESA/390 load PSW (LPSW) is still supported and can be used to load an ESA/390 format PSW. When LPSW is executed and the computing environment is in z/Architecture mode, the processor expands the ESA/390 format PSW to the z/Architecture format, including inverting bit 12. This is the reverse of collapsing the z/Architecture PSW format that the operating system performs to create the ESA/390 format PSW. That is, in computing environments that support both ESA/390 and z/Architecture, when a copy of a PSW is placed in storage, the operating system collapses the full z/Architecture PSW to the size and format of an ESA/390 PSW. Thus, other software with PSW format dependencies can be unaware of the z/Architecture PSW.

Machine Check Mask (M) 614: Bit 13 controls whether the CPU is enabled for interruption by machine check conditions. When the bit is zero, a machine check interruption cannot occur. When the bit is one, machine check interruptions due to system damage and instruction processing damage are permitted, but interruptions due to other machine check subclass conditions are subject to the subclass mask bits in control register 14.

Wait State (W) 616: When bit 14 is one, the CPU is waiting; that is, no instructions are processed by the CPU, but interruptions may take place. When bit 14 is zero, instruction fetching and execution occur in the normal manner. The wait indicator is one when the bit is one.

Problem State (P) 618: When bit 15 is one, the CPU is in the problem state. When bit 15 is zero, the CPU is in the supervisor state. In the supervisor state, all instructions are valid. In the problem state, only those instructions are valid that provide meaningful information to the problem program and that cannot affect system integrity; such instructions are called unprivileged instructions. The instructions that are not valid in the problem state are called privileged instructions. When a CPU in the problem state attempts to execute a privileged instruction, a privileged operation exception is recognized. Another group of instructions, called semiprivileged instructions, are executed by a CPU in the problem state only if specific authority tests are met; otherwise, a privileged operation exception or some other program exception is recognized, depending on the particular requirement which is violated.

Address Space Control (AS) 620: Bits 16 and 17, in conjunction with PSW bit 5, control the translation mode.

Condition Code (CC) 622: Bits 18 and 19 are the two bits of the condition code. The condition code is set to 0, 1, 2, or 3 depending on the result obtained in executing certain instructions. Most arithmetic and logical operations, as well as some other operations, set the condition code. The instruction BRANCH ON CONDITION can specify any selection of the condition code values as a criterion for branching.

Program Mask 624: Bits 20-23 are the four program mask bits. Each bit is associated with a program exception, as follows:

| Program Mask Bit | Program Exception |
|---|---|
| 20 | Fixed point overflow |
| 21 | Decimal overflow |
| 22 | HFP exponent underflow |
| 23 | HFP significance |

When the mask bit is one, the exception results in an interruption. When the mask bit is zero, no interruption occurs. The setting of the HFP-exponent-under-flow-mask bit of the HFP-significance-mask bit also determines the manner in which the operation is completed when the corresponding exception occurs.

Extended Addressing Mode (EA) 626: Bit 31 controls the size of effective addresses and effective address generation in conjunction with bit 32, the basic addressing mode bit. When bit 31 is zero, the addressing mode is controlled by bit 32. When bits 31 and 32 are both one, 64-bit addressing is specified.

Basic Addressing Mode (BA) 628: Bits 31 and 32 control the size of effective addresses and effective address generation. When bits 31 and 32 are both zero, 24-bit addressing is specified. When bit 31 is zero and bit 32 is one, 31-bit addressing is specified. When bits 31 and 32 are both one, 64-bit addressing is specified. Bit 31 one and bit 32 zero is an invalid combination that causes a specification exception to be recognized. The addressing mode does not control the size of PER addresses or of addresses used to access DAT, ASN, dispatchable unit control, linkage, entry, and trace tables or access lists or the linkage stack. The control of the addressing mode by bits 31 and 32 of the PSW is summarized as follows:

| PSW: 31 | PSW: 32 | Addressing Mode |
|---|---|---|
| 0 | 0 | 24-bit |
| 0 | 1 | 31-bit |
| 1 | 1 | 64-bit |

Instruction Address 630: Bits 33-63 of the PSW are the instruction address. The address designates the location of the leftmost byte of the next instruction to be executed, unless the CPU is in the wait state (bit 14 of the PSW is one).

As described above, in addition to the Load PSW instruction, the Load Real Address instruction may cause a No-DAT exception to be recognized.

Figure 7A:
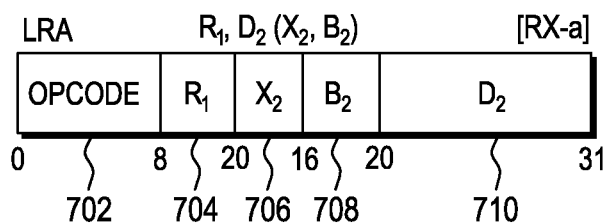
FIGS. 7A-7C depict example formats of a Load Real Address instruction.
Figure 7B:
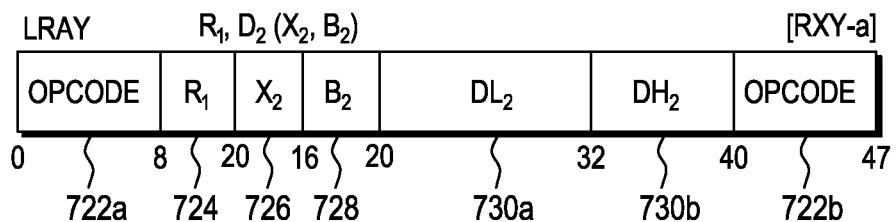
Figure 7C:
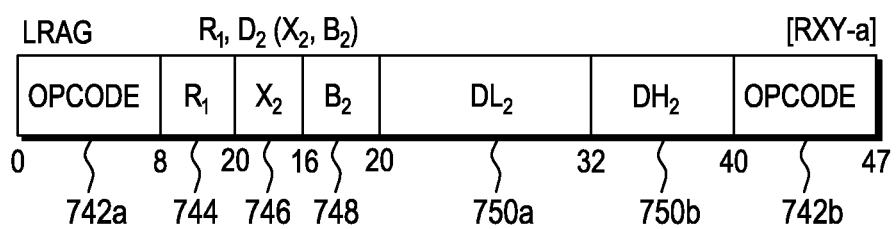

Example formats of the Load Real Address instruction are depicted in FIGS. 7A-7C. As shown in FIG. 7A, in one embodiment, a Load Real Address instruction 700 has a plurality of fields including, for instance, an operation code field 702 having an opcode indicating a load real address operation; a first register field ($R_1$) 704; an index field ($X_2$) 706; a base field ($B_2$) 708; and a displacement field ($D_2$) 710.

In another embodiment, referring to FIG. 7B, a Load Real Address instruction 720 has a plurality of fields including, for instance, an operation code field 722a, 722b having an opcode indicating a load read address operation; a first register field ($R_1$) 724; an index field ($X_2$) 726; a base field ($B_2$) 728; and a plurality of displacement fields ($DL_2$, $DH_2$) 730a, 730b.

In yet another embodiment, referring to FIG. 7C, a Load Real Address instruction 740 has a plurality of fields including, for instance, an operation code field 742a, 742b having an opcode indicating a load read address operation; a first register field ($R_1$) 744; an index field ($X_2$) 746; a base field ($B_2$) 748; and a plurality of displacement fields ($DL_2$, $DH_2$) 750a, 750b.

In the above formats, $R_1$ specifies a general register that includes a first operand; and contents of the general registers designated by the $X_2$ and $B_2$ fields are added to the contents of the $D_2$ field or $DH_2$ and $DL_2$ fields to form the second operand address.

For Load Real Address (LRA, LRAY) in the 24-bit or 31-bit addressing mode, if bits 0-32 of the 64-bit real or absolute address corresponding to the second operand virtual address are all zeros, bits 32-63 of the real or absolute address are placed in bit positions 32-63 of general register $R_1$, and bits 0-31 of the register remain unchanged. If bits 0-32 of the real address or absolute are not all zeros, a special operation exception is recognized.

For LRA or LRAY in the 64-bit addressing mode, and for Load Real Address (LRAG) in any addressing mode, the 64-bit real or absolute address corresponding to the second operand virtual address is placed in general register $R_1$.

When EDAT-1 (Enhanced DAT-1) does not apply, or when EDAT-1 applies but the second operand is translated by means of a segment table entry (STE) in which the STE-format control is zero, the address placed in general register $R_1$ is real. When EDAT-1 applies and the second operand is translated by means of a segment table entry in which the STE format control is one, or when EDAT-2 applies and the second operand is translated by means of a region third table entry in which the RTTE format control is one, the address placed in general register $R_1$ is absolute.

The virtual address specified by the $X_2$, $B_2$, and $D_2$ fields is translated by means of the dynamic address translation facility, regardless of whether DAT is on or off The displacement for LRA is treated as a 12-bit unsigned binary integer. The displacement for LRAY and LRAG is treated as a 20-bit signed binary integer.

DAT is performed by using an address-space-control element that depends on the current value of the address-space-control bits, bits 16 and 17 of the PSW, as shown in the following table:

| PSW Bits 16 and 17 | Address Space Control Element Used by DAT |
|---|---|
| 00 | Contents of control register 1 |
| 10 | Contents of control register 7 |
| 01 | The address space control element obtained by applying the access register translation (ART) process to the access register designated by the $B_2$ field |
| 11 | Contents of control register 13 |

ART and DAT may be performed with the use of the ART-lookaside buffer (ALB) and translation-lookaside buffer (TLB), respectively.

The virtual-address computation is performed according to the current addressing mode, specified by bits 31 and 32 of the current PSW.

The addresses of the region-table entry or entries, if used, and of the segment-table entry and page-table entry, if used, are treated as 64-bit addresses regardless of the current addressing mode. It is unpredictable whether the addresses of these entries are treated as real or absolute addresses.

Condition code 0 is set when both ART, if applicable, and DAT can be completed and a special-operation exception is not recognized, that is, when an address-space-control element can be obtained, the entry in each DAT table lies within the table and has a zero I bit, and, for LRA or LRAY in the 24-bit or 31-bit addressing mode, bits 0-32 of the resulting real or absolute address are zeros. The translated address is not inspected for boundary alignment or for addressing or protection exceptions.

When PSW bits 16 and 17 are 01 binary and an address-space-control element cannot be obtained because of a condition that would normally cause one of the exceptions shown below, (1) the interruption code assigned to the exception is placed in bit positions 48-63 of general register $R_1$, bit 32 of this register is set to one, bits 33-47 are set to zeros, and bits 0-31 remain unchanged, and (2) the instruction is completed by setting condition code 3.

| Exception Name | Cause | Code (Hex) |
|---|---|---|
| ALET specification | Access list entry token (ALET) bits 0-6 not all zeros | 0028 |
| ALEN translation | Access list entry (ALE) outside list or invalid (bit 0 is one) | 0029 |
| ALE sequence | ALE sequence number (ALESN) in ALET not equal to ALESN in ALE | 002A |
| ASTE validity | ASN-second table entry (ASTE) invalid (bit 0 is one) | 002B |
| ASTE sequence | ASTE sequence number (ASTESN) in ALE is not equal to ASTESN in ASTE | 002C |
| Extended authority | ALE private bit not zero, ALE authorization index (ALEAX) not equal to extended authorization index (EAX), and secondary bit selected by EAX either outside authority table or zero. | 002D |

When ART is completed normally, the operation is continued through the performance of DAT.

When the segment table entry is outside the table and bits 0-32 of the real or absolute address of the entry are all zeros, condition code 3 is set, bits 32-63 of the entry address are placed in bit positions 32-63 of general register $R_1$, and bits 0-31 of the register remain unchanged. If bits 0-32 of the address are not all zeros, the result is as shown below.

For LRA or LRAY in the 64-bit addressing mode or LRAG in any addressing mode, when the I bit in the segment table entry is one, condition code 1 is set, and the 64-bit real or absolute address of the segment table entry is placed in general register $R_1$. In this case except that LRA or LRAY is in the 24-bit or 31-bit addressing mode, if bits 0-32 of the address of the segment table entry are all zeros, the result is the same except that bits 0-31 of general register $R_1$ remain unchanged. If bits 0-32 of the address are not all zeros, the result is as shown below.

For LRA or LRAY in the 64-bit addressing mode or LRAG in any addressing mode, when the I bit in the page table entry is one, condition code 2 is set, and the 64-bit real or absolute address of the page table entry is placed in general register $R_1$. In this case except that LRA or LRAY is in the 24-bit or 31-bit addressing mode, if bits 0-32 of the address of the page table entry are all zeros, the result is the same except that bits 0-31 of general register $R_1$ remain unchanged. If bits 0-32 of the address are not all zeros, the result is as shown below.

A segment table entry or page table entry address placed in general register $R_1$ is real or absolute in accordance with the type of address that was used during the attempted translation.

If a condition exists that would normally cause one of the exceptions shown below, (1) the interruption code assigned to the exception is placed in bit positions 48-63 of general register $R_1$, bit 32 of this register is set to one, bits 33-47 are set to zeros, and bits 0-31 remain unchanged, and (2) the instruction is completed by setting condition code 3.

| Exception Name | Cause | Code (Hex) |
|---|---|---|
| ASCE type | Address space control element (ASCE) being used is a region second table designation and bits 0-10 of virtual address not all zeros; ASCE is a region third table designation, and bits 0-21 of virtual address not all zeros; or ASCE is a segment table designation, and bits 0-32 of virtual address not all zeros. | 0038 |
| Region first translation | Region first table entry selected by region first index portion of virtual address outside table or invalid. | 0039 |
| Region second translation | Region second table entry selected by region second index portion of virtual address outside table or invalid. | 003A |
| Region third translation | Region third table entry selected by region third index portion of virtual address outside table or invalid. | 003B |
| Segment translation | Segment table entry selected by segment index portion of virtual address outside table (only when bits 0-32 of entry address not all zeros); or segment table entry invalid (LRA or LRAY only, and only n 24-bit or 31-bit addressing mode when bits 0-32 of entry address not all zeros). | 0010 |
| Page translation | Page table entry selected by page index portion of virtual address invalid (LRA and LRAY only, and only in 24-bit or 31-bit addressing mode when bits 0-32 of entry address not all zeros). | 0011 |

Special Conditions

A special-operation exception is recognized when, for LRA or LRAY in the 24-bit or 31-bit addressing mode, bits 0-32 of the resultant 64-bit real address are not all zeros.

An addressing exception is recognized when the address used by ART to fetch the effective access list designation or the ALE, ASTE, or authority-table entry designates a location which is not available in the configuration or when the address used to fetch the region table entry or entries, if any, segment table entry, or page table entry designates a location which is not available in the configuration.

A translation-specification exception is recognized when an accessed region table entry or the segment table entry or page table entry has a zero I bit and a format error.

A carry out of bit position 0 as a result of the addition done to compute the address of a region table entry or the segment table entry may be ignored or may result in an addressing exception.

The operation is suppressed on all addressing exceptions.
Resulting Condition Code:
0 Translation available
1 Segment-table entry invalid (I bit one)
2 Page table entry invalid (I bit one)
3 Address-space-control element not available, region table entry outside table or invalid (I bit one), segment table entry outside table, or, for LRA and LRAY only, and only in 24-bit or 31-bit addressing mode when bits 0-32 of entry address not all zeros, segment table entry or page table entry invalid (I bit one)

Program Exceptions:
Addressing (effective access-list designation, access-list entry, ASN-second-table entry, authority-table entry, region table entry, segment table entry, or page table entry)
Operation (LRAY, if the long-displacement facility is not installed)
Privileged operation
Special operation (LRA, LRAY only)
Transaction constraint
Translation specification
Programming Notes:
1. Caution is to be exercised in the use of Load Real Address in a multiprocessing configuration. Since Invalidate DAT Table Entry or Invalidate Page Table Entry may set I bits in storage to one before causing the corresponding entries in TLBs of other CPUs to be cleared, the simultaneous execution of Load Real Address on this CPU and either Invalidate DAT Table Entry or Invalidate Page Table Entry on another CPU may produce inconsistent results. Because Load Real Address may access the tables in storage, the region table entries, segment table entry or page table entry may appear to be invalid (condition codes 3, 1, or 2, respectively) even though the corresponding TLB entry has not yet been cleared, and the TLB entry may remain in the TLB until the completion of Invalidate DAT Table Entry or Invalidate Page Table Entry on the other CPU. There is no guaranteed limit to the number of instructions which may be executed between the completion of Load Real Address and the TLB being cleared of the entry.

The above cautions for using Load Real Address also apply when Compare And Swap And Purge or Compare And Replace DAT Table Entry is used to explicitly set the invalid bit in a DAT-table entry.

In addition to Load PSW and Load Real Address instructions, a Set System Mask instruction may also cause a No-DAT exception to be recognized.

Figure 8:
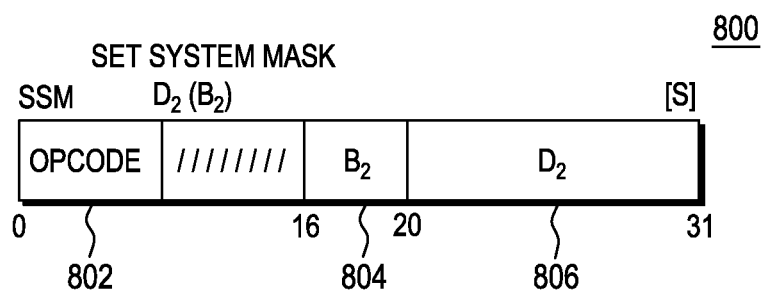
FIG. 8 depicts one example format of a Set System Mask instruction.

One embodiment of a format of a Set System Mask instruction is described with reference to FIG. 8. Referring to FIG. 8, a Set System Mask instruction 800 includes, for instance, an operation code field 802 having an operation code (opcode) to specify a set system mask operation; a base field ($B_2$) 804; and a displacement field ($D_2$) 806.

In operation, bits 0-7 of the current PSW are replaced by the byte at the location designated by the second-operand address (formed by adding contents of a general register specified by $B_2$ with a value of the displacement field).

Special Conditions
When the SSM suppression control bit, bit 33 of control register 0, is one and the CPU is in the supervisor state, a special operation exception is recognized.

The value to be loaded into the PSW is not checked for validity before loading, a specification exception is recognized, and a program interruption occurs, if the contents of bit positions 0 and 2-4 of the PSW are not all zeros. In this case, the instruction is completed, and the instruction-length code is set to 2. The specification exception is listed as a program exception for this instruction. This exception maybe considered as caused by execution of this instruction or as occurring early in the process of preparing to execute the subsequent instruction.

Figure 9:
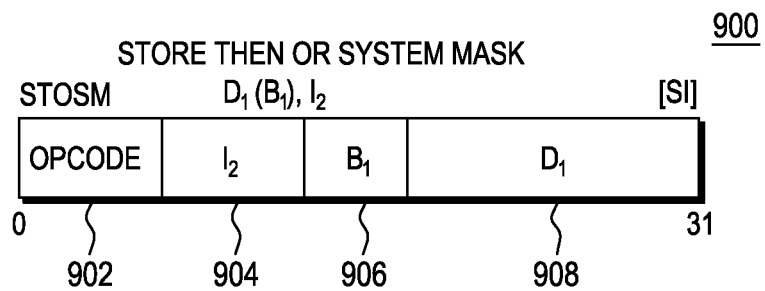
FIG. 9 depicts one example format of a Store Then OR System Mask instruction.

The operation is suppressed on all addressing and protection exceptions.
Condition Code: The code remains unchanged.
Program Exceptions:

Access (fetch, operand 2)
Privileged operation
Special operation
Specification
Transaction constraint Further, a Store Then OR System Mask instruction may cause a No-Dat exception to be recognized. One embodiment of a format of a Store Then OR System Mask instruction is described with reference to FIG. 9. Referring to FIG. 9, a Store Then Or System Mask instruction 900 includes, for instance, an operation code field 902 having an opcode to specify a store then OR system mask operation; an immediate field ($I_2$) 904; a base field ($B_1$) 906; and a displacement field ($D_1$) 908. In one example, contents of a register specified by $B_1$ are added to the displacement field to provide an address of a first operand. The immediate field is a second operand.

In operation, bits 0-7 of the current PSW are stored at the first operand location. Then, the contents of bit positions 0-7 of the current PSW are replaced by the logical OR of their original contents and the second operand ($I_2$ field).

Special Conditions
The value to be loaded into the PSW is not checked for validity before loading. However, immediately after loading, a specification exception is recognized, and a program interruption occurs, if the contents of bit positions 0 and 2-4 of the PSW are not all zeros. In this case, the instruction is completed, and the instruction length code is set to 2. The specification exception is listed as a program exception. It may be considered as occurring early in the process of preparing to execute the following instruction.

The operation is suppressed on addressing and protection exceptions.
Condition Code: The code remains unchanged.
Program Exceptions:
Access (store, operand 1)
Privileged operation
Specification
Transaction constrained Programming note: The Store Then Or System Mask instruction permits the program to set selected bits in the system mask to ones while retaining the original contents for later restoration. For example, the program may enable the CPU for I/O interruptions without having available the current status of the external mask bit.

For cases 1 (Load PSW) and 3-5 (Set System Mask, Store Then Or System Mask, interruption) described above, immediately after changing bit 5 of the PSW to one from zero, a No-DAT exception is recognized, and a program interruption occurs. In these cases, the instruction execution or PSW swap, as applicable, is completed and the instruction-length code is zero. The No-DAT exception may be considered as occurring early in the process of preparing to execute the next, sequential instruction. Thus, the instruction located at the instruction address specified by the program-old PSW is nullified. The No-DAT exception is indicated by a program interruption code of 003D hex (or 00BD hex if a concurrent PER event is indicated).

An interruption includes storing the current PSW as an old PSW, storing information identifying the cause of the interruption, and fetching a new PSW. Processing resumes as specified by the new PSW.

The old PSW stored on an interruption normally contains the address of the instruction that would have been executed next had the interruption not occurred, thus permitting resumption of the interrupted program. For program and supervisor-call interruptions, the information stored also contains a code that identifies the length of the last executed instruction, thus permitting the program to respond to the cause of the interruption. In the case of some program conditions for which the normal response is re-execution of the instruction causing the interruption, the instruction address directly identifies the instruction last executed.

Except for restart, an interruption can occur only when the CPU is in the operating state. The restart interruption can occur when the CPU is in either the stopped or operating state.

Except for PER basic events, only one program interruption condition is indicated with a program interruption. The existence of one condition, however, does not preclude the existence of other conditions. When more than one program interruption condition exists, in one example, the condition having the highest priority is identified in the interruption code. When multiple conditions of the same priority apply, it is unpredictable which is indicated.

When multiple parts of the same storage operand are subject to separate access controls, the priority of access exceptions associated with the parts is unpredictable and is not necessarily related to the sequence specified for the access of bytes within the operand. For example, when (a) the first operand of a MOVE (MVC) instruction crosses a segment boundary, (b) the invalid bit is one on the segment table entry used to translate the leftmost part of the operand, and (c) the DAT-protection bit is one in a valid page table entry used to translate the rightmost part of the operand, then it is unpredictable whether a segment-translation exception or protection exception is recognized.

When an instruction has two storage operands and access exception conditions exist for both operands, it is unpredictable which condition is recognized. A subsequent execution of the same instruction (with the same exception conditions) may result in the exception condition being recognized for the same operand as the first execution, or for the other operand.

The type of ending which occurs (nullification, suppression, or termination) is that which is defined for the type of exception that is indicated in the interruption code. However, if a condition is indicated which permits termination, and another condition also exists which would cause either nullification or suppression, then the unit of operation is suppressed.

One embodiment of processing associated with providing a No-DAT facility in a computing environment that supports multiple architectural modes is described with reference to FIG. 10. In this particular example, both architectural modes are configured for a selected architectural function (i.e., each is defined to include, e.g., DAT), but a first architectural mode supports the function, while in the second architectural mode the function is removed (e.g., unsupported, bypassed, eliminated from the architecture, etc.) so that it cannot be turned on even if there is a DAT turn on/off control.

Figure 10:
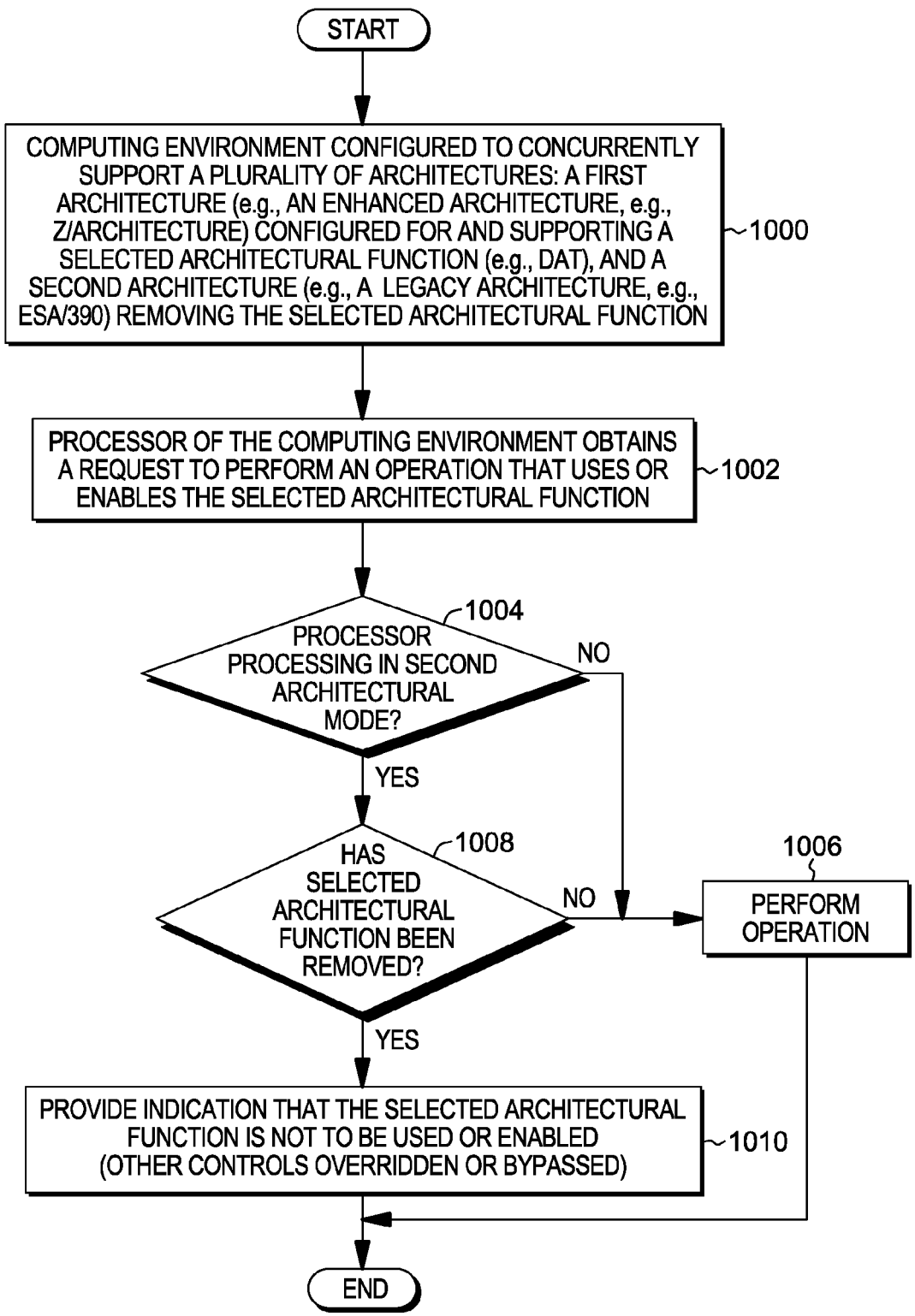
FIG. 10 depicts one embodiment of processing associated with a No-DAT facility.

Referring to FIG. 10, in one example, a computing environment is configured to concurrently support a plurality of architectures: a first architecture (e.g., an enhanced architecture, e.g., z/Architecture) configured for and supporting a selected architectural function (e.g., DAT); and a second architecture (e.g., a legacy architecture, e.g., ESA/390) configured for but selectively removing the selected architectural function, STEP 1000. In removing the function (e.g., turning No-DAT on or providing No-DAT as a permanent factory-installed option), DAT cannot be turned on even if another control is set to turn it on.

A processor of the computing environment obtains a request to perform an operation that includes the selected architectural function, STEP 1002. A determination is made as to whether the processor is processing in a second architectural mode based on the second architecture, INQUIRY 1004. If the processor is processing in an architectural mode different than the second architecture, such as the first architecture, e.g., z/Architecture, the selected architectural function is performed, STEP 1006.

Returning to INQUIRY 1004, if the processor is in the second architectural mode, then a determination is made as to whether the selected architectural function has been removed, INQUIRY 1008. In one embodiment, this is determined by checking a facility indicator and/or another indicator. If the function has not been removed (e.g., No-DAT is not installed), then the selected architectural function (e.g., DAT) is performed, STEP 1006. Otherwise, an indication is provided that the selected architectural function is not to be performed, STEP 1010. For instance, an error is provided. The error may be an exception, and either a known exception type or a new exception type may be used.

Although in the above example, the second architectural mode is configured for DAT, but DAT is removed from the architecture, in another embodiment, the second architectural mode is not configured for DAT, but instead, the second architecture includes a reduced set of an architecture in which one or more selected architectural functions (such as DAT) are absent. In this case, DAT is also said to be removed from the architecture.

In a further embodiment, the NDAT facility is included in a computing environment that includes pageable storage mode guests. In such an environment, in one example, the host is initialized and processes in a first architectural mode (e.g., z/Architecture) and guests may be initialized in either the first architectural mode or another architectural mode, such as the second architectural mode (e.g., ESA/390 or a subset thereof). In a pageable storage mode guest in the ESA/390 architectural mode, when the No-DAT facility is installed, the following actions occur, in one example:

1. In one embodiment, when NDAT is installed, the guest effectively behaves as if DAT is not provided, regardless of other indicators (e.g., any and all other indicators) present in a state control or otherwise controlling execution in a virtual environment that may govern the availability of DAT or other features.
2. When an attempt to enable DAT functions, use DAT functions or execute instructions requiring the presence of DAT functions (e.g., including, but not limited to, the LRA instruction) is made, a No-DAT exception program interruption is presented.

Figure 11A:
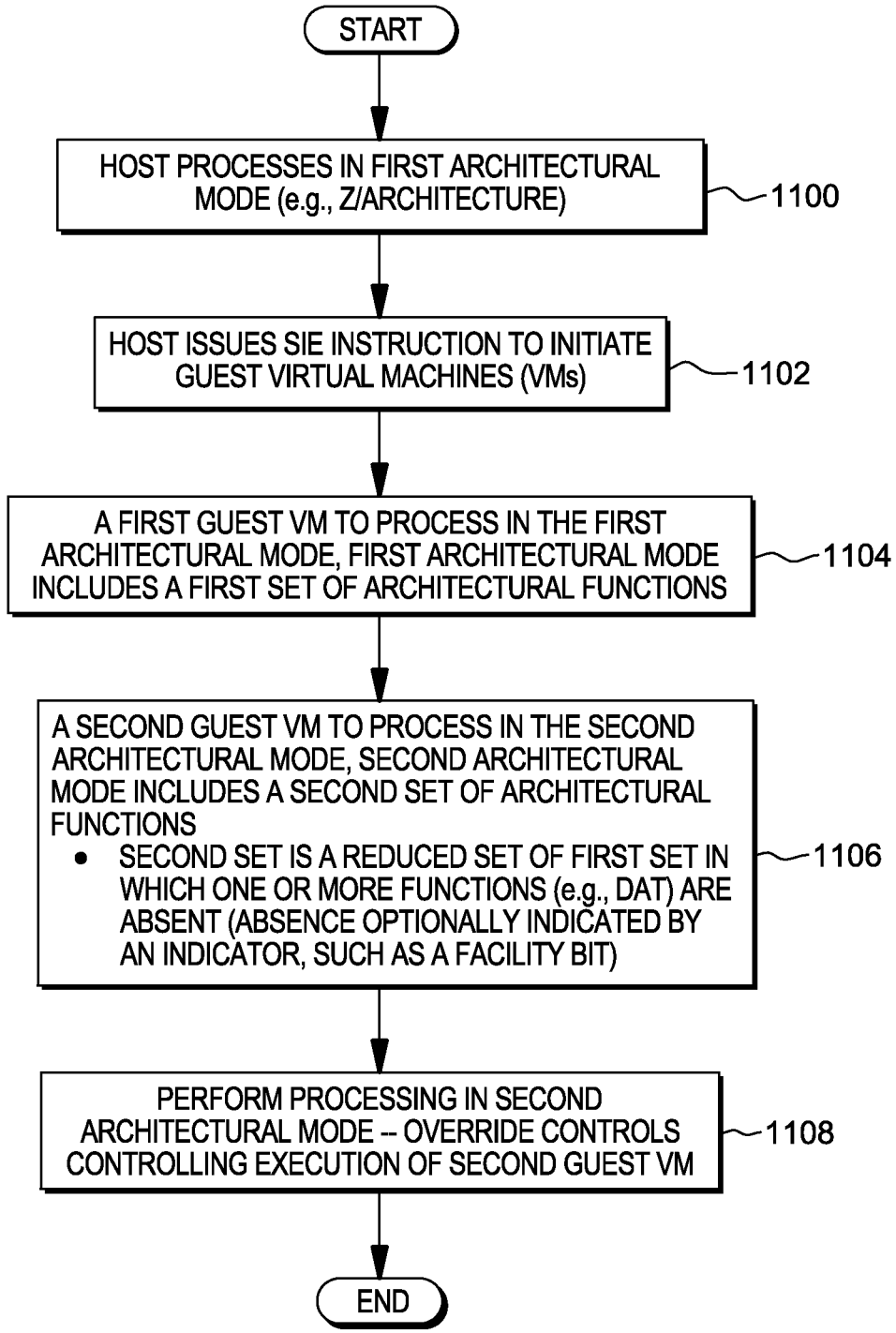
FIGS. 11A-11B depict one embodiment of processing associated with a No-DAT facility in a virtual computing environment.
Figure 11B:
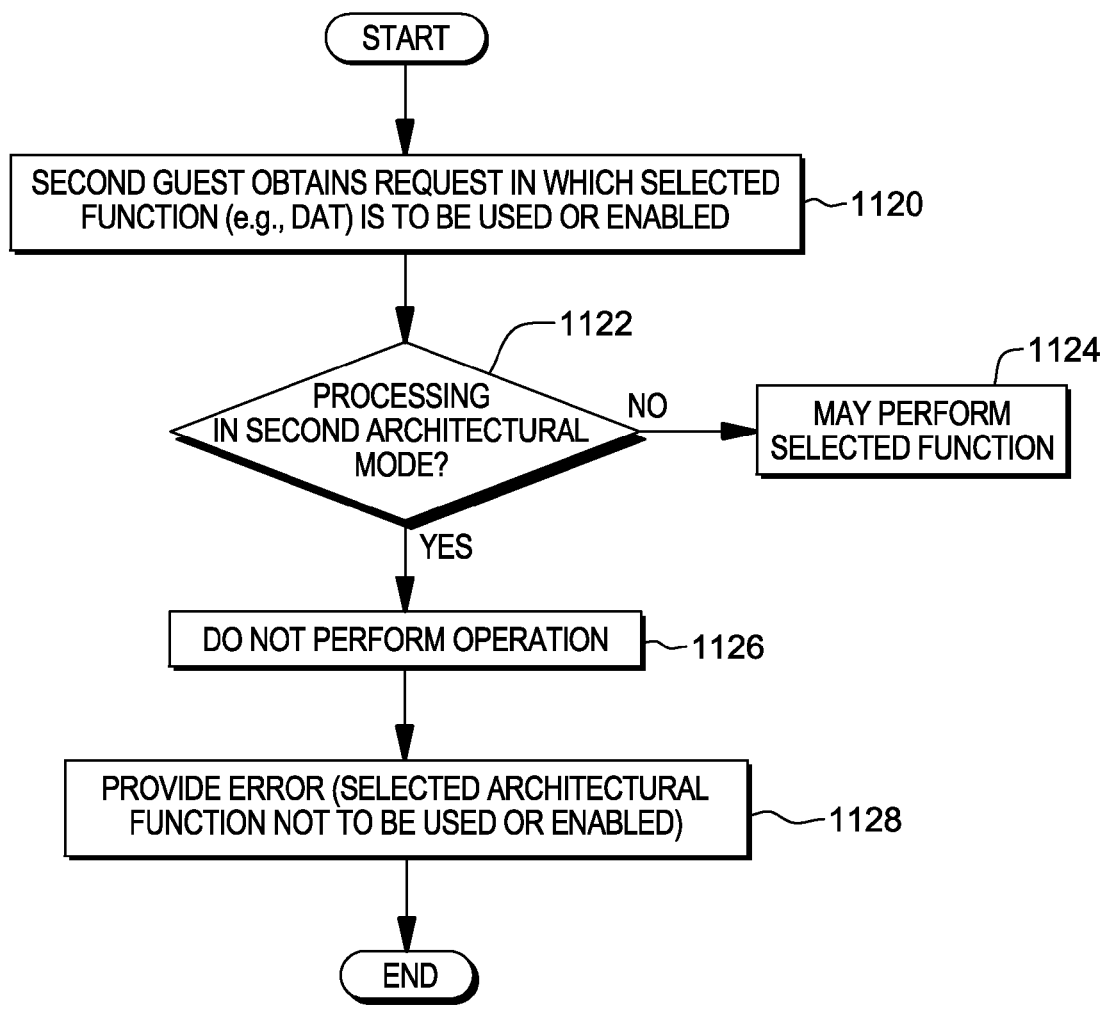

One embodiment of logic to provide a No-DAT facility in a guest environment is described with reference to FIGS. 11A-11B. Referring to FIG. 11A, a host processing in a first architectural mode (e.g., the z/Architecture), STEP 1100, issues a start interpretative execution instruction to initiate one or more guest virtual machines, STEP 1102. A first guest virtual machine is to process in the first architectural mode and that first architectural mode has a first instruction set architecture and includes a first set of architectural functions, STEP 1104. However, a second guest virtual machine is to process in a second architectural mode, STEP 1106, and the second architectural mode has a second instruction set architecture and includes a second set of architectural functions. The second set of architectural functions is a reduced set of the first set in which one or more functions (e.g., a selected architectural function, such as DAT) are absent. Thus, the second architectural mode is a function inhibit mode, which inhibits a function, such as DAT. In one example, the absence of the selected architectural function is indicated via a facility bit. However, this is optional in one or more embodiments.

In one particular embodiment, the first architectural mode includes 64-bit addressing and uses 64-bit general purpose registers and the second architectural mode includes 31-bit addressing and uses 32-bit general registers.

The second guest virtual machine performs processing in the second architectural mode, and this processing overrides one or more controls associated with the selected architectural function that may be used to control execution of the second guest virtual machine, STEP 1108. For instance, if an indicator is used to indicate DAT is on, this indicator is a control which is overridden when the No-DAT facility is installed for the second guest virtual machine. As a further example, the specification of the architecture corresponding to the virtual machine controls the availability of particular features, and this specification is also a control that is overridden by the NDAT facility. Other examples of controls that are overridden are also possible.

In one embodiment, the second guest obtains a request to perform an operation which is to use or enable a selected function (e.g., DAT), STEP 1120. A determination is made as to whether the second guest is processing in the second architectural mode, INQUIRY 1122. If the second guest is not processing in the second architectural mode, then the operation may be performed, which may use or enable the selected architectural function, STEP 1124. However, if the second guest is processing in the second architectural mode, and thus, the selected function is not supported (i.e., it is removed), then the operation is not performed, STEP 1126, and an error is provided, STEP 1128.

Although in the embodiment described above both guests are level one guests (i.e., each initialized by a host), in a further example, one or more guests are second level guests, in which a guest is initiated by another guest. In such an embodiment, if the second level guest is to be processed in ESA/390, then No-DAT is the default. That is, the second level guest initiated in ESA/390 is not to use DAT regardless of other controls (e.g., SIE controls) that may indicate differently. Any other controls pertaining to DAT are overridden. Further, in one embodiment, this is the default for the second level guest, even if the first level guest and/or the host are able to execute DAT in ESA/390 or z/Architecture. In yet another embodiment, ESA/390 virtual machines can only be created as guest-2 virtual machines, and are not available in one or both of host and guest-1 mode.

While the functions have been described with particular reference to the provision of a No-DAT facility for a second architecture, aspects described herein may be applied to other processor functions that may be disabled in one architectural mode and be provided in yet another architectural mode of a guest or host environment.

Described herein is a capability for providing an instruction set and excluding data address translation for an architecture, for instruction and data. Further described in one embodiment are controls for removing data address translation from a particular architecture. In one embodiment the removing is in accordance with a control register; and in a further embodiment, in accordance with one or more default modes to automatically enable the removing of data address translation, e.g., for guest 2. Additionally, in one embodiment, an interrupt is provided to indicate an attempt to enable and/or use DAT when DAT is removed. Further, in one or more embodiments, an operating mode for a virtualization environment is provided.

As described herein, a facility is provided to remove selected functions, such as DAT translations, from a particular architecture so that it no longer has to be tested. When a program (such as a supervisor program) attempts to enable a removed function, an indication is provided, such as an error or an exception (using either a known exception code or a new code), as examples. Additionally, when a program attempts to execute an instruction making use of the removed function, an indication is provided, such as an error or an exception, as examples.

In one embodiment, the No-DAT facility may be used with one or more other facilities including, for instance, a CZAM facility and/or a control utility boot facility, described in the following co-filed, commonly assigned applications entitled "Architectural Mode Configuration," Gainey, et al., (IBM Docket No.: POU920140021US1); and "Common Boot Sequence for Control Utility Able to be Initialized in Multiple Architectures," Michael K. Gschwind, (IBM Docket No.: POU920140019US1), respectively, each of which is hereby incorporated by reference herein in its entirety.

Figure 12:
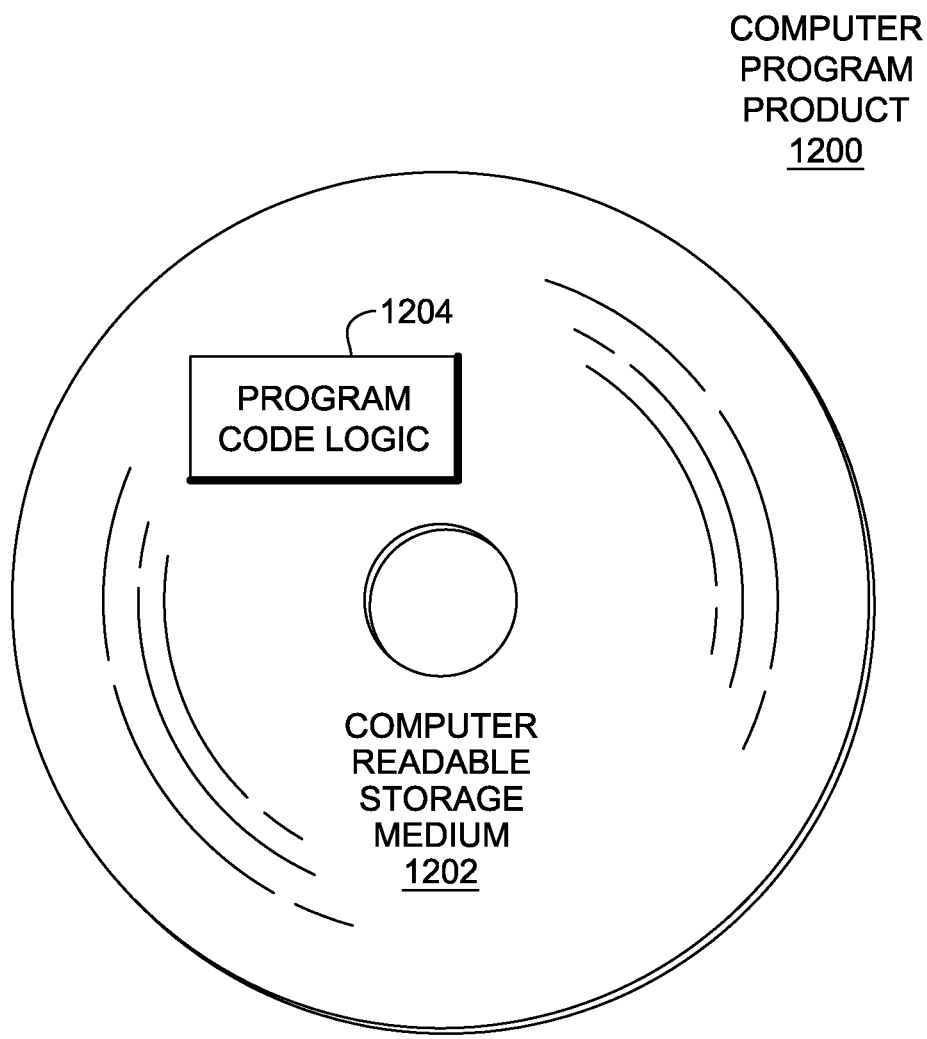
FIG. 12 depicts one embodiment of a computer program product.

Referring to FIG. 12, in one example, a computer program product 1200 includes, for instance, one or more non-transitory computer readable storage media 1202 to store computer readable program code means, logic and/or instructions 1204 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Yet further, other types of address translation may benefit from one or more aspects. Moreover, other architectural functions may be similarly removed. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 13:
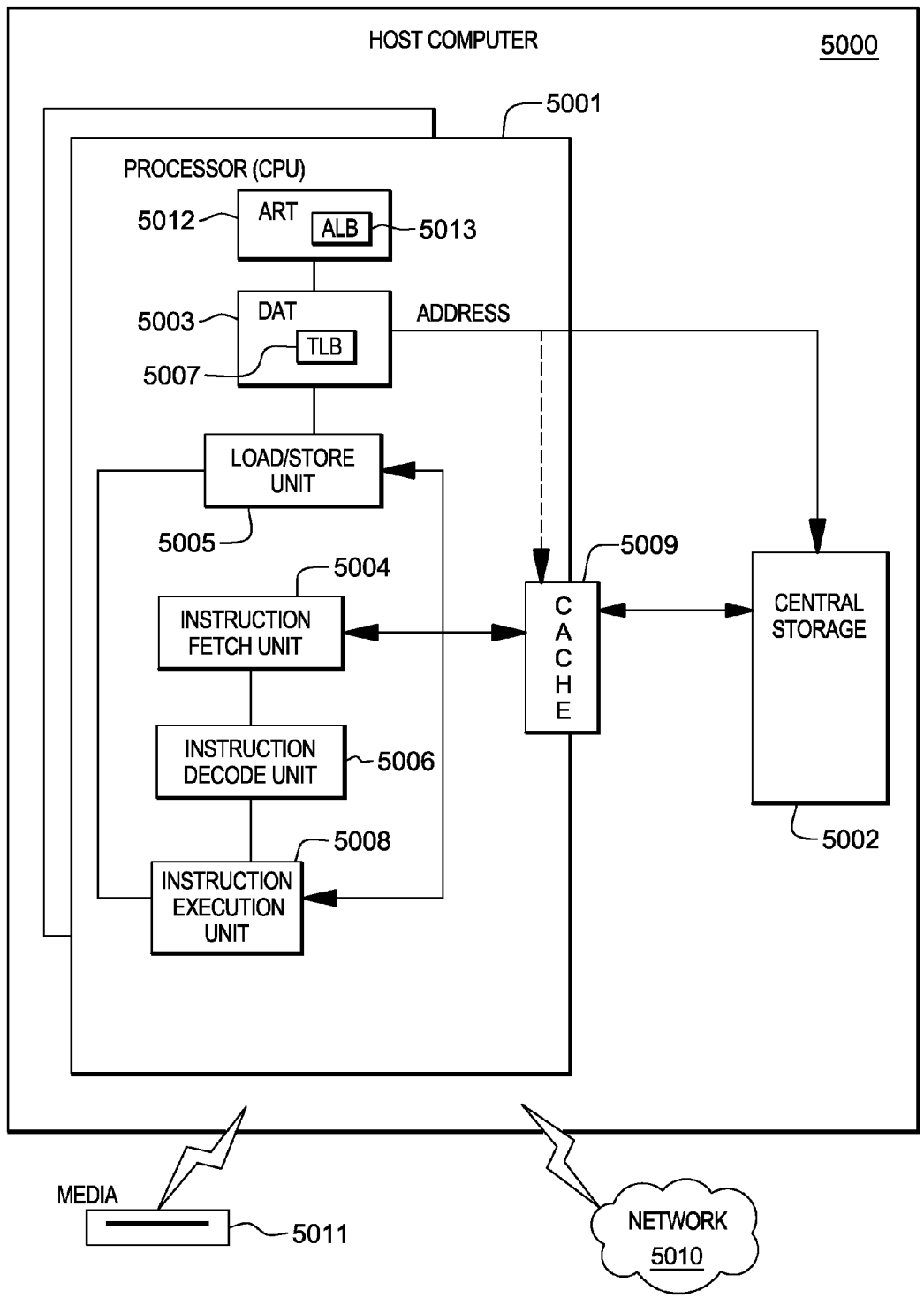
FIG. 13 depicts one embodiment of a host computer system.

Referring to FIG. 13, representative components of a Host Computer system 5000 to implement one or more embodiments are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have access register translation (ART) 5012, which includes an ART lookaside buffer (ALB) 5013, for selecting an address space to be used by dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses.

In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. In another embodiment, this information may be obtained from firmware, e.g., in accordance with interfaces specified by the Power Architecture Platform Reference specification. A model may also provide one or more of data cache block touch (dcbt), PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the Power ISA and z/Architecture, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the Power ISA and z/Architecture, bits are numbered in a left-to-right sequence. In the Power ISA and z/Architecture, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. In one example, bits 8-31 and 1-31 apply to addresses that are in a location (e.g., register) that is 32 bits wide, whereas bits 40-63 and 33-63 apply to addresses that are in a 64-bit wide location. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, 16, and 32 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. An octoword is a group of 32 consecutive bytes on a 32-byte boundary. When storage addresses designate halfwords, words, doublewords, quadwords, and octowords, the binary representation of the address contains one, two, three, four, or five rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one example, the embodiment may be practiced by software (sometimes referred to licensed internal code, firmware, micro-code, milli-code, pico-code and the like, any of which would be consistent with one or more embodiments). Referring to FIG. 13, software program code which embodies one or more aspects may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 14:
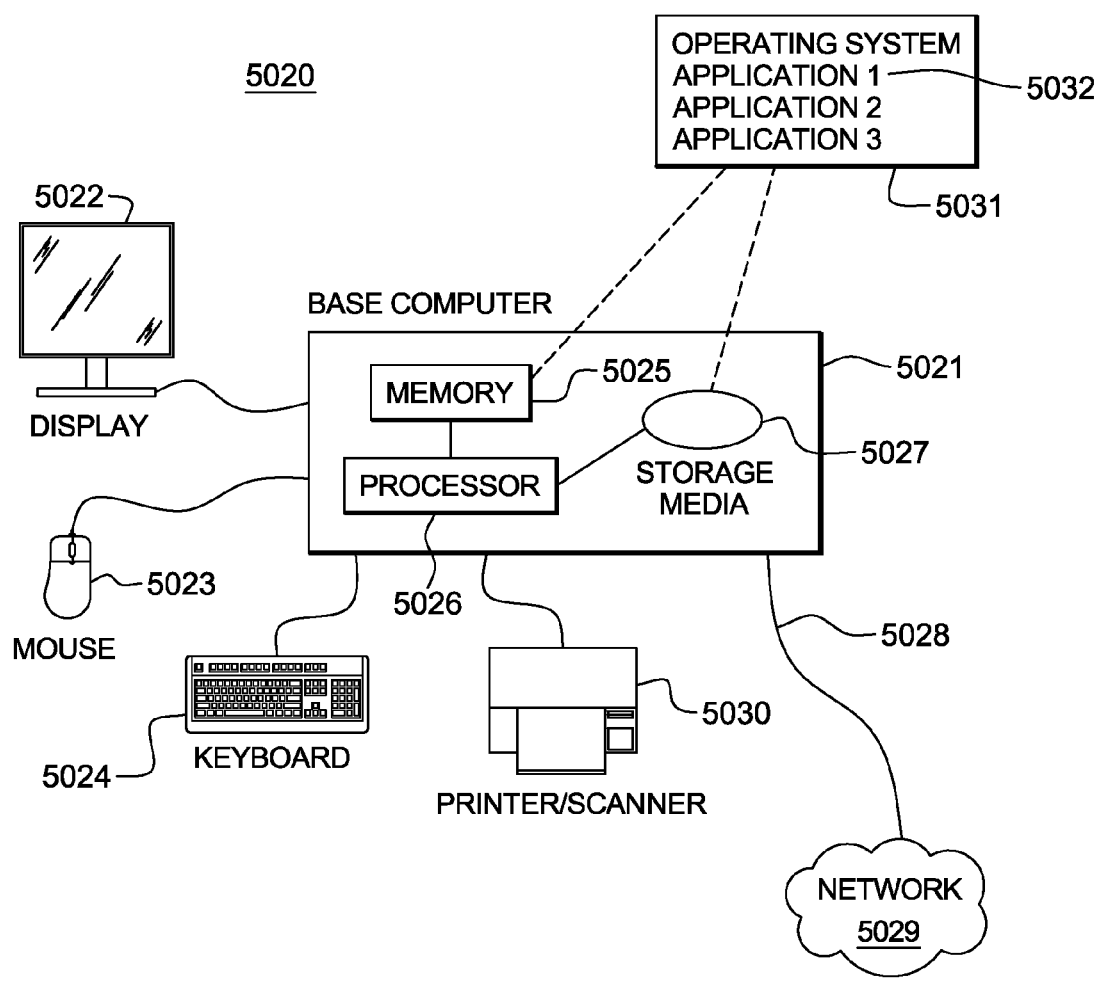
FIG. 14 depicts a further example of a computer system.

FIG. 14 illustrates a representative workstation or server hardware system in which one or more embodiments may be practiced. The system 5020 of FIG. 14 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 15:
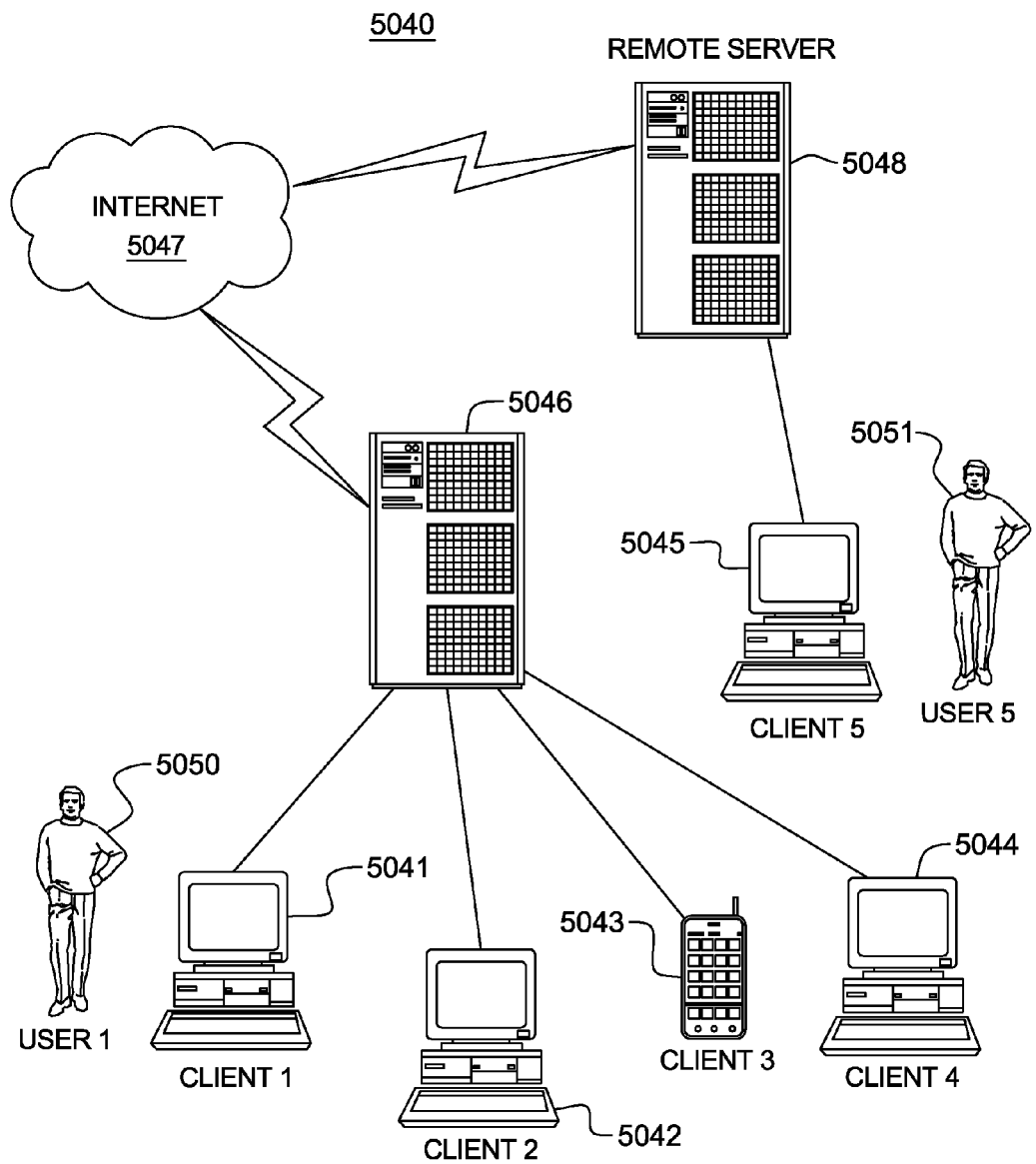
FIG. 15 depicts another example of a computer system comprising a computer network.

FIG. 15 illustrates a data processing network 5040 in which one or more embodiments may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 15, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing one of an IBM Power Systems server and an IBM System z server available from International Business Machines Corporation.

Referring concurrently to FIG. 14 and FIG. 15, software programming code 5031 which may embody one or more aspects may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 16:
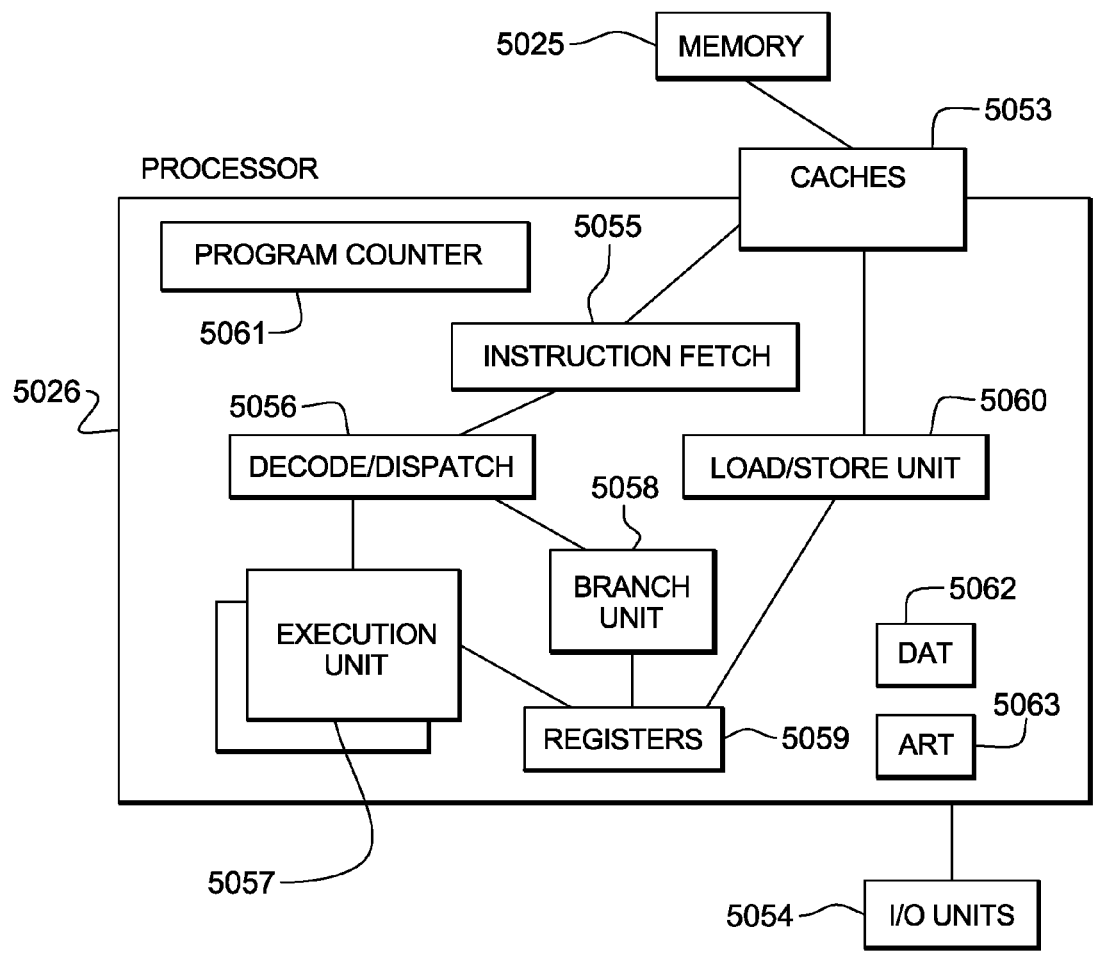
FIG. 16 depicts one embodiment of various elements of a computer system.

Referring to FIG. 16, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture processor is 64 bits and can be truncated to 31 or 24 bits to support prior addressing limits. A program counter in a Power Architecture processor is 64 bits and can be truncated to 32 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. Instructions of the IBM Power ISA are RISC instructions having a length of 4 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Virtual addresses are transformed into real addresses using dynamic address translation 5062 and, optionally, using access register translation 5063.

Figure 17A:
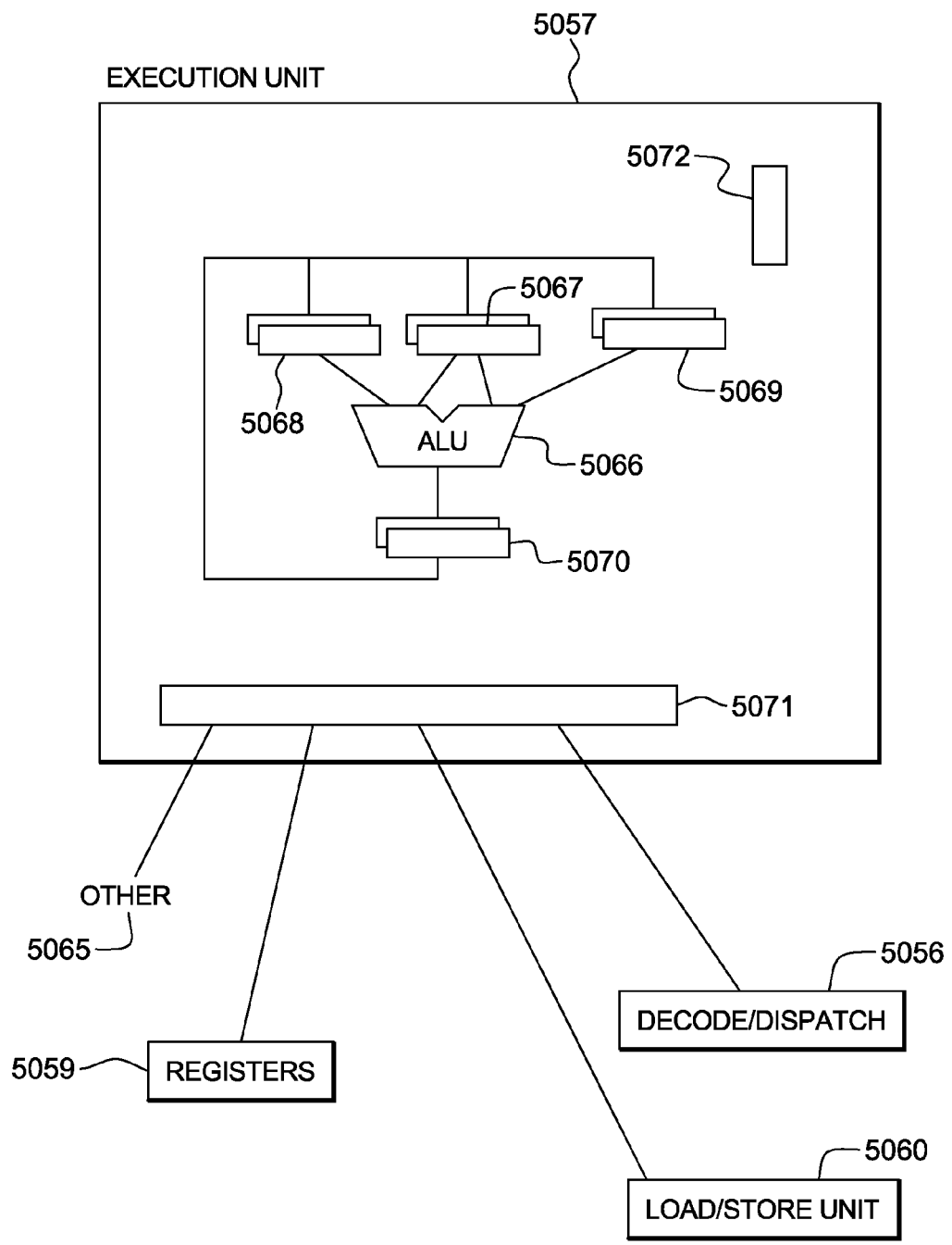
FIG. 17A depicts one embodiment of the execution unit of the computer system of FIG. 16.

A processor 5026 typically has one or more units 5057, 5058, 5060 for executing the function of the instruction. Referring to FIG. 17A, an execution unit 5057 may communicate 5071 with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. The IBM Power ISA supports both Big Endian and Little Endian execution modes. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 17B:
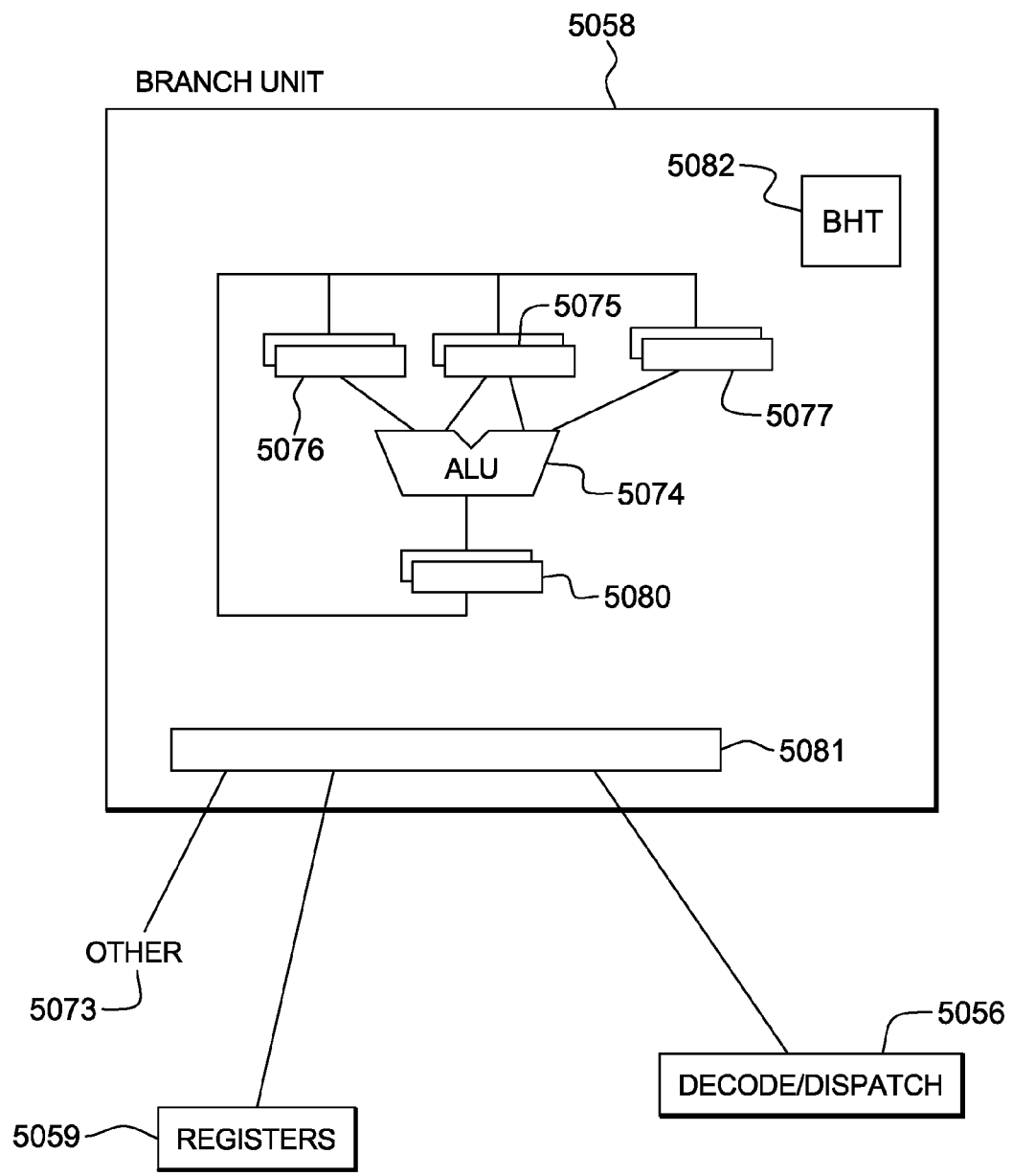
FIG. 17B depicts one embodiment of the branch unit of the computer system of FIG. 16.

Referring to FIG. 17B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate 5081 with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory for example; or the Power ISA addressing modes where D-Form addresses define a base register and an immediate field (displacement field) that are added together to provide the address of the operand in memory; and wherein X-Form addresses define a base register and an index register that are added together to provide the address of the operand in memory. Location herein typically implies a location in main memory (main storage) unless otherwise indicated.

Figure 17C:
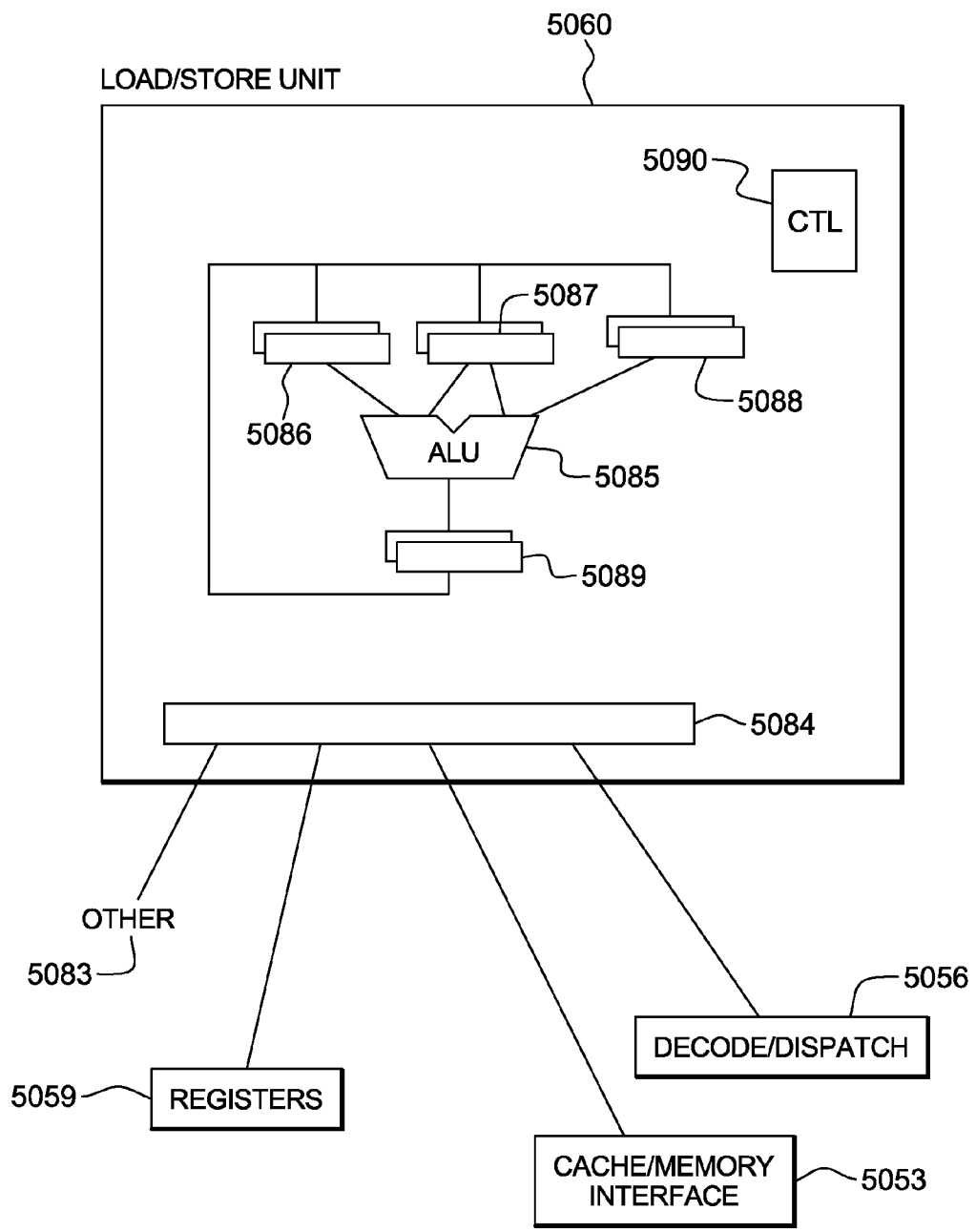
FIG. 17C depicts one embodiment of the load/store unit of the computer system of FIG. 16.

Referring to FIG. 17C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate 5084 with general registers 5059, decode/dispatch unit 5056, cache/memory interface 5053 or other elements 5083 and comprises various register circuits 5086, 5087, 5088 and 5089, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 16) provide the processor with means for attaching to peripheral devices including tape, disc, printers, displays, and networks for example. I/O units are often presented to the computer program by software drivers. In mainframes, such as the System z from IBM®, channel adapters and open system adapters are I/O units of the mainframe that provide the communications between the operating system and peripheral devices. In RISC servers, such as Power Systems from IBM®, proprietary adapters and open system adapters are I/O units that provide the communications between the operating system and peripheral devices.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more embodiments, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a Power Systems or a z/Architecture IBM® Server, or alternatively in machines executing other architectures. They can be emulated in the existing and in future IBM® mainframe servers, Power Systems servers and on other machines of IBM® (e.g., System x Servers). They can be executed in machines running Linux on a wide variety of machines using hardware manufactured by IBM®, Intel®, AMD, and others. Besides execution on that hardware under a Power Architecture or z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 18:
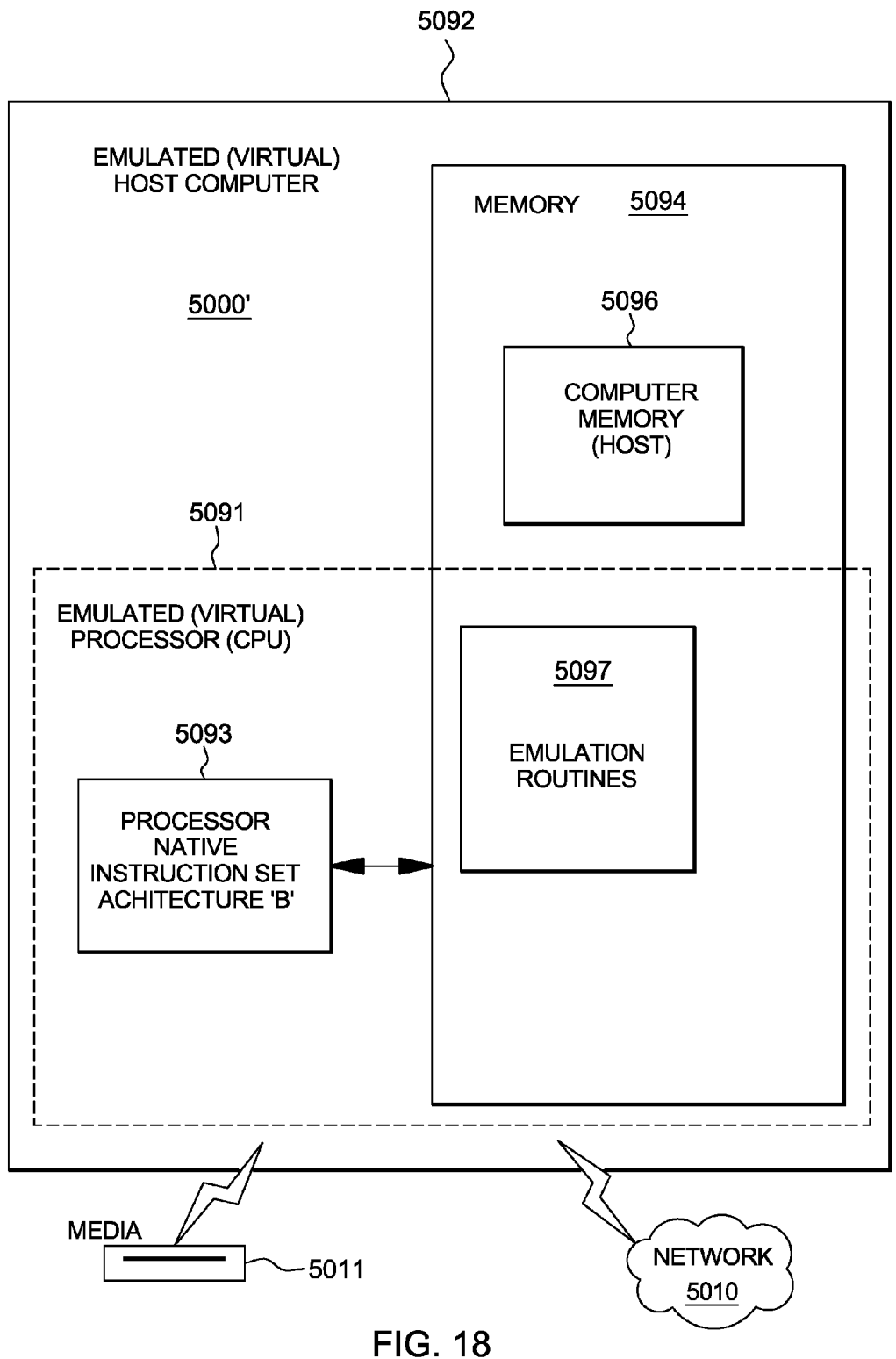
FIG. 18 depicts one embodiment of an emulated host computer system.

In FIG. 18, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 19:
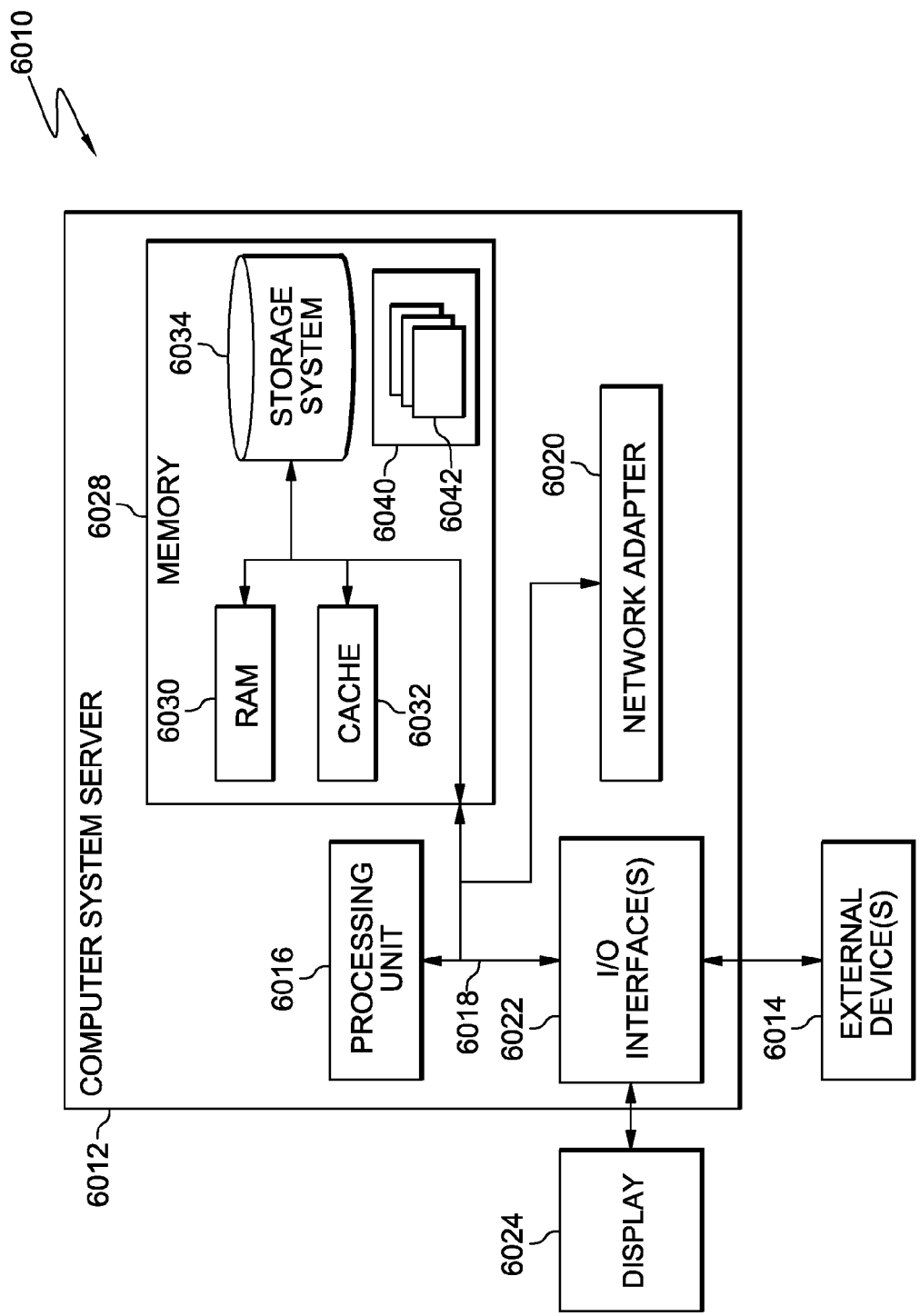
FIG. 19 depicts one embodiment of a cloud computing node.

Referring now to FIG. 19, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 19, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 20:
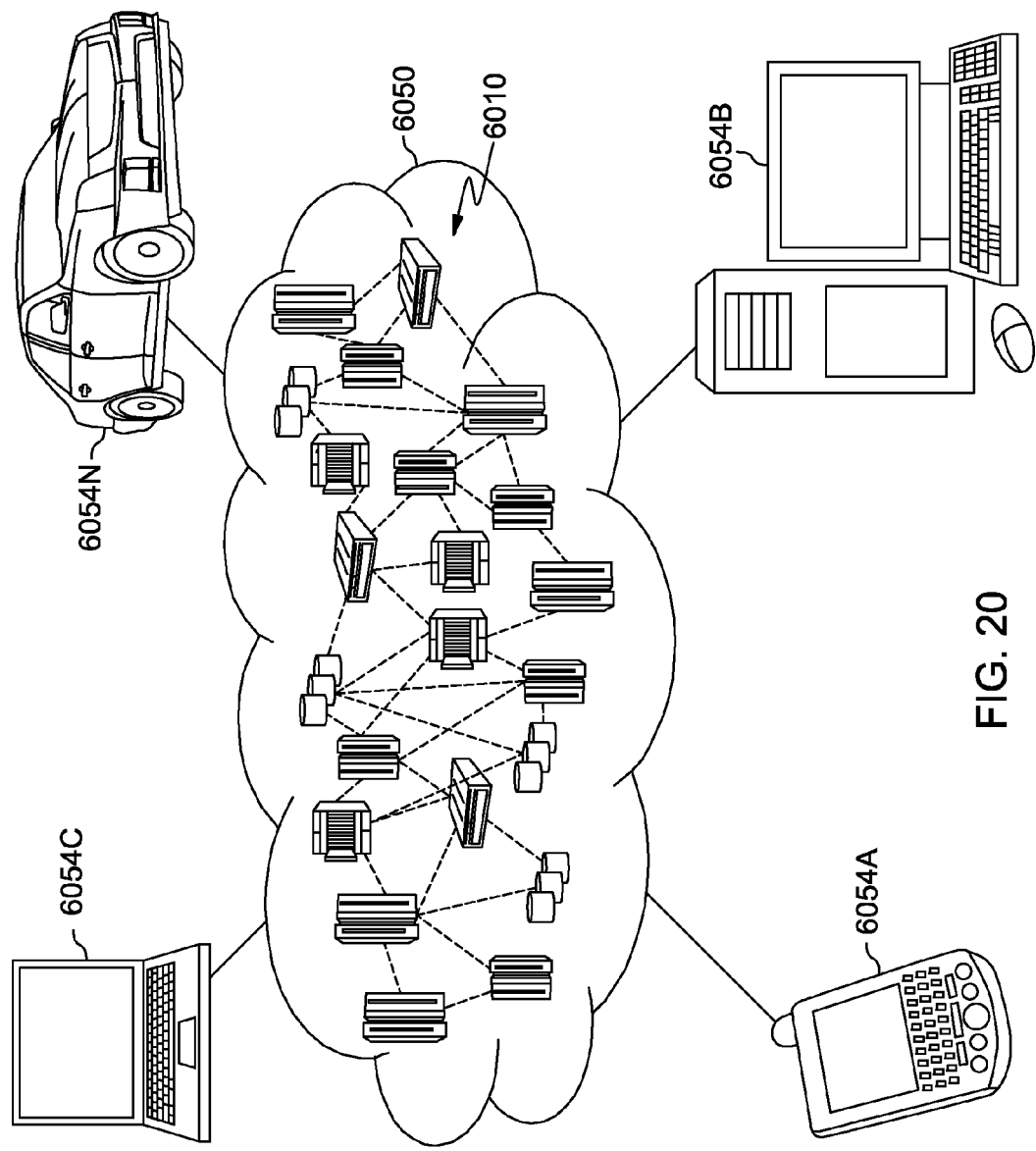
FIG. 20 depicts on embodiment of a cloud computing environment.

Referring now to FIG. 20, illustrative cloud computing environment 6050 is depicted. As shown, cloud computing environment 6050 comprises one or more cloud computing nodes 6010 with which local computing devices used by cloud consumers, such as, for example, personal digital assistant (PDA) or cellular telephone 6054A, desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 20 are intended to be illustrative only and that computing nodes 6010 and cloud computing environment 6050 can communicate with any type of computerized device over any type of network and/or network addressable connection (e.g., using a web browser).

Figure 21:
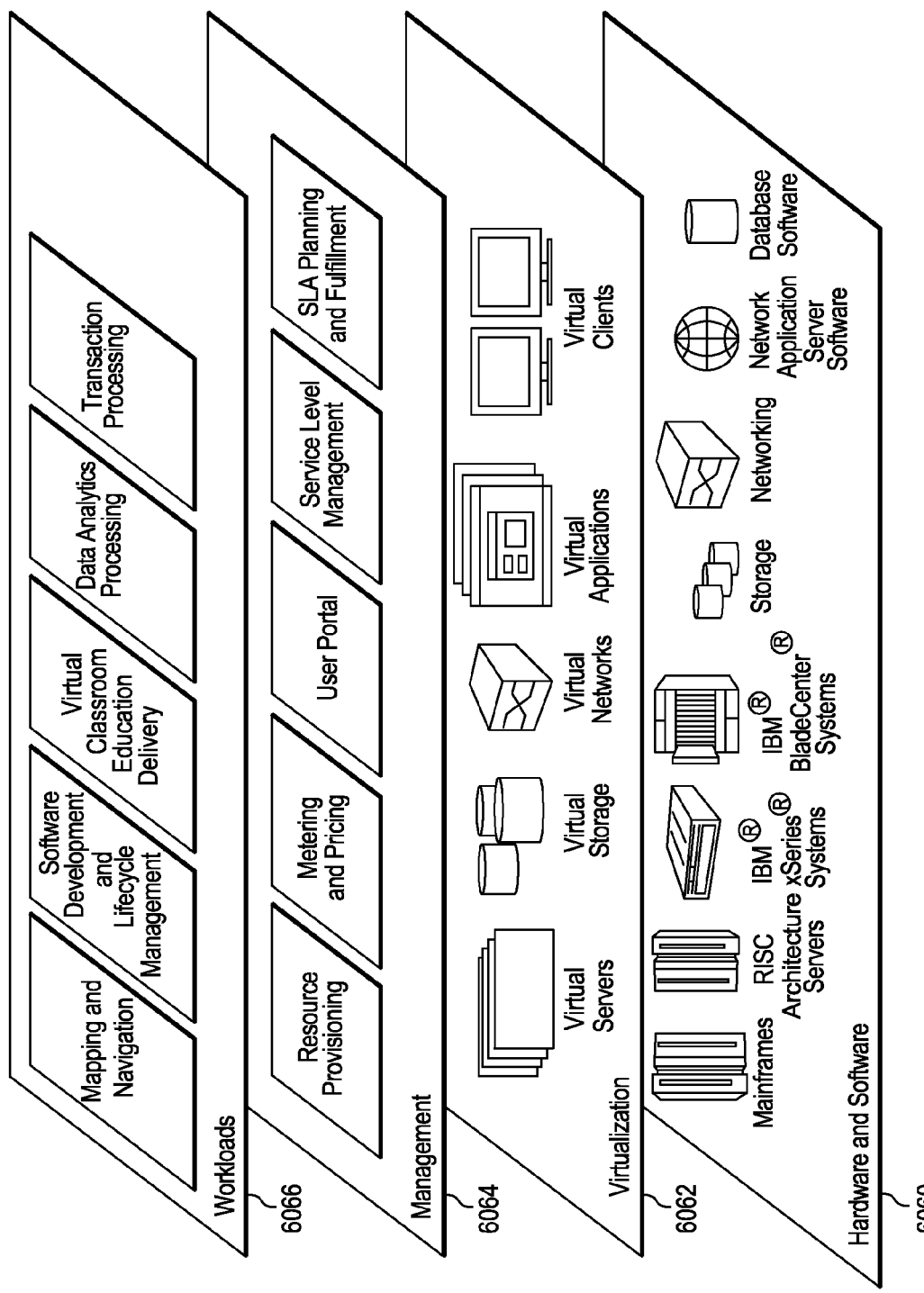
FIG. 21 depicts one example of abstraction model layers.

Referring now to FIG. 21, a set of functional abstraction layers provided by cloud computing environment 6050 (FIG. 20) is shown. It should be understood in advance that the components, layers, and functions shown in FIG. 21 are intended to be illustrative only and embodiments of the invention are not limited thereto. As depicted, the following layers and corresponding functions are provided:

Hardware and software layer 6060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 6062 provides an abstraction layer from which the following examples of virtual entities may be provided: virtual servers; virtual storage; virtual networks, including virtual private networks; virtual applications and operating systems; and virtual clients.

In one example, management layer 6064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 6066 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method of managing processing with a computing environment, said method comprising:
    initiating, by a host processor processing in a first architectural mode, a first guest virtual machine, the first guest virtual machine to process in the first architectural mode, the first architectural mode having a first instruction set architecture and providing a first set of architectural functions;
    initiating, by the host processor, a second guest virtual machine, the second guest virtual machine to process in a second architectural mode, wherein the second architectural mode has a second instruction set architecture and provides a second set of architectural functions, the second set of architectural functions being a reduced set of architectural functions provided in the first set of architectural functions, wherein a selected architectural function provided in the first set of architectural functions is absent from the second set of architectural functions, the second architectural mode being a function inhibit mode, and wherein the selected architectural function comprises dynamic address translation; and
    performing processing by the second guest virtual machine in the second architectural mode, wherein the performing processing overrides one or more controls associated with the selected architectural function that are defined to control execution of the second guest virtual machine, the overriding enforcing absence the selected architectural function from the second set of architectural functions.

2. The method of claim 1, further comprising:
    obtaining by the second guest virtual machine a request to perform an operation, the operation to use or enable the selected architectural function;
    based on obtaining the request, determining whether the second guest virtual machine is processing in the second architectural mode; and
    based on determining that the second guest virtual machine is processing in the second architectural mode, providing an indication that the selected architectural function is not to be used or enabled.

3. The method of claim 2, wherein the providing the indication includes indicating an error.

4. The method of claim 3, wherein the error is an exception.

5. The method of claim 2, wherein the operation comprises one of a load program status word instruction that attempts to turn on the selected architectural function, a load real address instruction, a set system mask instruction that attempts to turn on the selected architectural function, a store then OR system mask instruction that attempts to turn on the selected architectural function, or an interruption in which an interruption program status word attempts to turn on the selected architectural function.

6. The method of claim 1, wherein the selected architectural function is absent from the second set of architectural functions based on an indicator of the computing environment indicating that the selected architectural function is not supported regardless of whether an enabling/disabling indicator for the selected architectural function indicates enabled.

7. The method of claim 1, wherein the first architectural mode comprises 64-bit addressing and uses 64-bit general purpose registers, and the second architectural mode comprises 31-bit addressing and uses 32-bit general purpose registers.

\* \* \* \* \*